United States Patent
Palmer et al.

(10) Patent No.: US 10,565,215 B2
(45) Date of Patent: Feb. 18, 2020

(54) SYSTEM AND METHOD FOR PRESENTATION AND VISUAL NAVIGATION OF NETWORK DATA SETS

(71) Applicant: Patent Analytics Holding Pty Ltd, Melbourne (AU)

(72) Inventors: Ben Palmer, Brunswick West (AU); Doris Spielthenner, St Kilda (AU); Michael Lloyd, Niddrie (AU)

(73) Assignee: Patent Analytics Holding Pty Ltd, Melbourne (AU)

( * ) Notice: Subject to any disclaimer, the term of this patent is extended or adjusted under 35 U.S.C. 154(b) by 259 days.

(21) Appl. No.: 15/703,768

(22) Filed: Sep. 13, 2017

(65) Prior Publication Data

US 2018/0067947 A1  Mar. 8, 2018

Related U.S. Application Data

(63) Continuation of application No. 14/690,117, filed on Apr. 17, 2015, now Pat. No. 9,767,160, which is a
(Continued)

(51) Int. Cl.
*G06F 16/2457* (2019.01)
*G06F 16/34* (2019.01)

(52) U.S. Cl.
CPC ........ *G06F 16/24578* (2019.01); *G06F 16/34* (2019.01)

(58) Field of Classification Search
CPC .. G06F 16/34; G06F 16/24578; G06F 16/951; G06F 16/248; G06F 16/24;
(Continued)

(56) References Cited

U.S. PATENT DOCUMENTS

| 5,585,871 A | 12/1996 | Linden |
| 5,606,743 A | 2/1997 | Vogt et al. |

(Continued)

FOREIGN PATENT DOCUMENTS

| EP | 1184798 A2 | 3/2002 |
| EP | 0986789 B1 | 9/2002 |

(Continued)

OTHER PUBLICATIONS

Chin, Si-Chi, et al., "Firework Visualization: A Model for Local Citation Analysis," Proceedings of the 2nd ACM SIGHIT International Health Informatics Symposium (IHI '12), Jan. 28-30, 2012, pp. 121-130 [retrieved on Apr. 17, 2015]. Retrieved from the Internet <URL: http://dollar.biz.uiowa.edu/~street/research/ihi12_sichi.pdf.

(Continued)

*Primary Examiner* — Evan Aspinwall
(74) *Attorney, Agent, or Firm* — Kilpatrick Townsend & Stockton LLP

(57) ABSTRACT

Disclosed herein is a computer implemented method of determining a similarity score of a plurality of data records with a target data record in a data set. The similarity score allows a user to identify secondary data records, or pairs of data records, that disclose similar concepts. Also disclosed herein is a computer implemented method for presentation and visual navigation of a data set including related data records. The presentation of a data set using the disclosed method allows users of to quickly identify data records that are very similar to a data record of interest. The data set may include directly connected or indirectly connected patents.

18 Claims, 15 Drawing Sheets

Related U.S. Application Data continuation of application No. PCT/AU2013/001223, filed on Oct. 18, 2013.

(60) Provisional application No. 61/795,579, filed on Oct. 19, 2012.

(58) Field of Classification Search
CPC .... G06F 16/2465; G06F 16/334; G06F 16/93; G06F 16/26; G06F 16/382; G06F 2216/11; G06F 16/287; G06F 16/9038; G06F 17/221
USPC ........................................................ 707/749
See application file for complete search history.

(56) References Cited

U.S. PATENT DOCUMENTS

| | | | |
|---|---|---|---|
| 6,349,001 | B1 | 2/2002 | Spitzer |
| 7,076,485 | B2 | 7/2006 | Bloedern |
| 7,092,857 | B1 | 8/2006 | Steiner |
| 7,433,884 | B2 | 10/2008 | Breitzman |
| 7,631,968 | B1 | 12/2009 | Dobson et al. |
| 7,647,287 | B1 | 1/2010 | Slonim et al. |
| 7,716,226 | B2 | 5/2010 | Barney |
| 7,930,301 | B2 | 4/2011 | Marcjan et al. |
| 2002/0035555 | A1* | 3/2002 | Wheeler ............... G06F 16/21 |
| 2004/0036716 | A1 | 2/2004 | Jordahl |
| 2006/0074867 | A1* | 4/2006 | Breitzman ............ G06Q 30/02 |
| 2007/0073748 | A1* | 3/2007 | Barney ............ G06F 16/24578 |
| 2010/0106752 | A1 | 4/2010 | Eckardt, III et al. |
| 2012/0011132 | A1 | 1/2012 | Spielthenner |

FOREIGN PATENT DOCUMENTS

| | | |
|---|---|---|
| JP | 2011138470 A | 7/2011 |
| WO | 0072256 A2 | 11/2000 |
| WO | 2006/001906 A2 | 1/2006 |
| WO | 2010/065108 A1 | 6/2010 |

OTHER PUBLICATIONS

International Search Report dated Jan. 22, 2014 in PCT Application No. PCT/AU2013/001223, 8 pages.

IPInquest—Intelligent Patent Analysis for Tomorrow's Solutions, Datasheet, IP Century AG, 2009, 2 pages.

Chen et al., "Adaptive Graphical Approach to Entity Resolution", Proceedings of the 7th ACM/IEEE-CS joint conference on Digital libraries, pp. 204-213, 2007, ACM.

Conesa et al., "Blast2GO: a universal tool for annotation, visualization and analysis in functional genomics research", Bioinformatics, vol. 21, No. 18, pp. 3674-3676, 2005, Oxford University Press.

Jurczyk et al., "Fine-Grained Record Integration and Linkage Tool", Birth Defects Research (Part A): Clinical and Molecular Teratology 82, pp. 822-829, 2008, Wiley InterScience.

Elfeky et al., "Tailor: a record linkage toolbox", Proceedings. 18th International Conference on Data Engineering, pp. 17-28, 2002, IEEE.

Yin, Xiaoshi et al.; "Mining and modeling linkage information from citation context for improving biomedical literature retrieval"; Information Processing and Management; 2011; 47; p. 53-67.

Zaiane, Osmar R. et al.; "DBconnect: Mining Research Community on DBLP Data"; Joint 9th WEBKDD and 1st SNA-KDD Workshop '07 (WebKDD/SNA-KDD '07); Aug. 12, 2007; San Jose, CA; 8 pages.

Chen, Jiyang et al.; "TupleRank: Ranking Relational Databases using Random Walks on Extended K-partite Graphs"; Jan. 2010; 26 pages.

Smucker, Mark D. et al.; "Find-Similar: Similarity Browsing as a Search Tool"; SIGIR '06; Aug. 6-11, 2006; Seattle, WA; 8 pages.

Jeh, Glen et al.; "SimRank: A Measure of Structural-Context Similarity"; Proceedings of the 8th ACM SIGKDD International Conference on Knowledge Discovery and Data Mining (KDD '02); Jul. 23-26, 2002; Edmonton, Alberta, Canada; 12 pages.

Non-Final Office Action dated Mar. 9, 2016 in U.S. Appl. No. 14/690,117. 14 pages.

Final Office Action dated Aug. 12, 2016 in U.S. Appl. No. 14/690,117. 13 pages.

* cited by examiner

SYSTEM AND METHOD FOR PRESENTATION AND VISUAL NAVIGATION OF NETWORK DATA SETS

CROSS-REFERENCES TO RELATED APPLICATIONS

This application claims priority to and is a continuation of U.S. application Ser. No. 14/690,117, filed Apr. 17, 2015, which is a continuation of International Application No. PCT/AU2013/001223, filed Oct. 18, 2013, which claims the benefit of U.S. Provisional Application No. 61/795,579, filed Oct. 19, 2012, the entire contents of which are herein incorporated by reference for all purposes.

TECHNICAL FIELD

The present invention relates to a system and method for visually navigating data sets including one or more networks of related data records, and particularly, although not exclusively to a system and method for interactive visual searching of intellectual property data sets, such as patent databases.

BACKGROUND OF THE INVENTION

With the advent of cheap and powerful computing systems and the development of the electronic database, there has been an explosion in the collection and electronic storage of data related to almost all areas of technology, industry, commerce and society. Data is generally held, in many instances, in the form of a "record", which typically comprises a series of attributes that describe a real world object or event. For example, one type of data record is a health record, which holds information regarding the attributes of a given person, such as their height, gender, weight, existing and past medical conditions, treatments undertaken etc. Another type of data record is that describing a scientific publication wherein a plurality of such data records may form a set and be held for example in a database of publications. Such a publications database can include attributes regarding the publications, such as the authors of each publication, citations or references to other publications, publication date and the subject matter of each publication.

Another structured set of data is data describing intellectual property rights, such as patent data records or trade mark data records. Many countries have legal regimes where owners or creators of intellectual property can register their rights to an invention, a sign and/or a design. Such records are highly structured and include a large number of attributes, such as a date of filing, the name of the owner or applicant, the names of the inventors or authors, data regarding the history of the invention and particular intellectual property office classification codes, such as the IPC (International Patent Classification) code, plus other attributes that describe the nature of the intellectual property right.

As patent data is effectively a record of innovative activity, value can be derived from searching patent data to extract commercially useful information. However, as an ever growing number of patents are filed every year, due to a constant increase in the rate of technological development and a greater awareness of the legal rights covering inventions, patent databases now contain millions or tens of millions of records, and in turn each patent data record contains a large and complex set of attributes. Therefore, traditional methods for searching such databases (such as by looking for keywords in the title, abstract or applicant details attributes) can lack precision, are prone to error and can return large and unwieldy data sets.

One method for selecting, analysing and visualising related database records utilises the network paradigm in view of the relationships that exist between and amongst at least some of the records. US Publication 2010/0106752 (Eckardt, III et al.) for example describes a network visualisation system and method for making sense of sets of related database records or documents by providing a network graphical representation of the records. However the difficulties inherent in analysing and graphically representing large and complex data sets, such as the representation of more than 1000 patent documents pictured in FIG. 13 of the '752 publication, are recognised. Eckardt considers at par [0177] that it is difficult to determine what is to be understood from this network graph of patent documents in which the nodes represent documents and the links are citation linkages.

Furthermore, without seeking professional assistance and studying each patent specification in detail, it is difficult to judge the relative worth or "merit" of a particular patent, or the underlying invention protected by the patent, in comparison to other patents and patented inventions. As such, traditional search methodologies struggle to adequately provide any sophisticated or high level information regarding the relative merit or worth of a patent.

In one proposal, U.S. Pat. No. 7,716,226 (Barney) describes a method and system for probabilistically quantifying and visualizing relevance between two or more citationally or contextually related data objects, in the context of statistically rating, valuing and analysing intellectual property assets including patents, patent applications and related documents. However, Barney relies on probabilistic analysis of patent documents particularly utilizing a multi-variate regression to provide a visual map. This approach has inherent drawbacks including inherent inaccuracies associated with averaging used

BRIEF SUMMARY OF THE INVENTION

Disclosed herein is a computer implemented method of determining a similarity score of a plurality of data records with a target data record. The method comprises the steps of:
  identifying the target data record from a data record set;
  identifying data records within the data set having primary and secondary connections with the target record to form a data record map, such records being primary and secondary data records;
  for at least one of the secondary data records determining an importance value and a relevance value, wherein the importance value is based on interconnections between the secondary data records and other data records in the data map and other data records in the data set, and the relevance value is based on interconnections between the secondary data records and other data records in the data map; and
  combining the importance value and the relevance value to provide the similarity score, wherein the similarity score allows a user to identify secondary data records that disclose similar concepts.

In some forms, the importance value for each of the at least one secondary data records is determined by;
  calculating a connection strength between the secondary data record and the primary data record connected to the secondary data record in the data map;
  determining a data record strength of each of the connected primary data record;

calculating a connection strength between the secondary data record with other secondary data records in the data map; and determining the data record strength of each of the secondary data records in the data set;

wherein the connection strengths and data record strengths are combined to form the importance value.

In some forms, the relevance value for each of the at least one secondary data records is determined by;

counting the number of times the secondary data record is connected to primary data records in the data map to form a first vote; and counting the number of times the secondary data record is connected to another secondary data record in the data map to form a second vote;

wherein the first and second votes are combined to form the relevance value.

In some forms, the relevance value for each of the at least one secondary data records is determined by;

calculating a connection distance between the secondary data records and the target data record in dependence on the connection strengths.

In some forms, the target data record is identified by a user. In at least one embodiment, the importance value and the relevance value are attributed a weighting and combined to calculate the similarity score.

In some forms, the data records are patents, the primary data record being connected to the target data record in that they share a citation. In some forms, the secondary data records are connected to the primary data records in that they share a citation. In at least one embodiment, the data map shows connections between data records.

Also disclosed herein is a system for ranking, reducing and presenting data records. The system may comprise:

an identifying means for identifying the target data record;

a processor configured to calculate the similarity score of the secondary data records, wherein the secondary data records are ranked in dependence on the similarity score;

a processor for reducing the secondary data records, the reducing being dependent on the ranking of the secondary data records; and a display means for presenting the reduced secondary data records with the primary and target data records, the presentation allowing the user to identify primary and secondary data records that disclose similar concepts.

In a second aspect, the present disclosure provides a computer implemented method for presentation and visual navigation of a data set including related data records, the method including the steps of:

receiving an identifier of a data record of interest from within a data set having at least some related data records;

determining records in the data set that are associated with the identified data record of interest;

generating a visual representation of the identified data record and associated data records in a graph structure wherein the data records are nodes that are interconnected by links each representing the association between respective data records, thereby forming a network;

displaying, upon selection of a node representing a data record, predetermined attribute information from the underlying data record for consideration;

allowing, during display of the predetermined attribute information, designation of a further data record of interest; and repeating the steps of the method utilising an identifier of the designated data record.

In an embodiment, the representation of each node reflects a score for the data record determined from the degree of connectivity with all other data records in the data set. Preferably, upon selection of a display icon, a visual cue is provided in the visual representation to guide attention to a node representing the next most relevant associated data record. Suitably the next most relevant data record is visually cued, at least in part, on the basis of the score determined for each of the associated data records. Most suitably, the associated data record with the next highest score is cued for user review.

In another embodiment, each link reflects the strength of the association between respective interconnected data records. Preferably the width and/or length of the links are proportional to the number of related data records associated with each pair of linked data records.

In a third aspect, the present disclosure provides a computer implemented method for presentation and visual navigation of a data set including related data records, the method including the steps of:

receiving an identifier of a data record of interest from within a data set having at least some related data records;

determining records in the data set that are associated with the identified data record of interest, including allocating a score to each data record determined from the degree of connectivity with other data records in the data set; and generating a visual representation of the identified data record and associated data records in a graph structure wherein the data records are nodes that are interconnected by links each representing the association between respective records, thereby forming a network; wherein:

the network visual representation includes phantom nodes, the phantom nodes being associated data records that are indirectly connected by links to the identified data record, and representing data records having a score below a predetermined threshold are represented, as are links with said phantom nodes, at a lower display intensity than data records having a score at or above the threshold.

Presenting phantom nodes, in the form of second order patents, as part of the network visual representation provides a number of advantages to the user (for example a patent examiner) of the computer implemented method. Including second order patents allows a patent examiner to quickly and efficiently identify data records that do not have a direct citation, i.e. patents that were not cited by examiners or patent applicants, with a patent of interest. This allows users of the method to quickly identify patents that are very similar to the patent of interest. Further, presenting patents in this way allows companies to easily find other companies that are operating in a very similar technical field.

In an embodiment, the score allocated to each data record has a value calculated from the number and degree of connections to other data records. Suitably the score may be normalised over all the records in the data set. In a particular embodiment wherein the data set is a patent database, the score allocated to a patent data record is calculated by a weighted combination of number of forward citations, number of backward citations and the relative age of the citations. Suitably the score allocated to each patent data record is normalised against the average score of patents in the patent database less than a predetermined period, for example 20 years.

In a forth aspect, the present disclosure provides a computer implemented method for presentation and visual navigation of a data set including related data records, the method including the steps of:
  receiving an identifier of a data record of interest from within a data set having at least some related data records;
  determining records in the data set that are associated with the identified data record of interest;
  generating a visual representation of the identified data record and the associated data records in a graph structure wherein the data records are nodes that are interconnected by links each representing the association between respective records, thereby forming a network;
  displaying, upon selection of a node representing a data record, underlying details of predetermined attributes from the data record for consideration; and
  effecting, during display of the predetermined attribute information, copying of said attribute information into a separate zone of the visual representation.

In an embodiment, the separate zone includes a list of the attribute information for each copied data record. The displaying step may further include an active window facilitating user entry of comments and/or assignment of a ranking to the data record represented by the selected node. Preferably, the user comments and/or the assigned ranking may be copied together with the attribute information, thereby providing an audit trail for viewing, storage or output, for example by printing.

In a fifth aspect, the present disclosure relates to a system for presentation and visual navigation of a data set including related data records, the system comprising:
a processor arranged for access to a data set including a plurality of related records; the processor associated with an interface and further arranged to:
  receive via the interface, an identifier of a data record of interest from within a data set;
  determine records in the data set that are associated with the identified data record of interest;
  generate via the interface, a visual representation of the identified data record and associated data records in a graph structure wherein the data records are nodes that are interconnected by links each representing the association between respective data records, thereby forming a network;
  display, upon selection of a node representing a data record via the interface, predetermined attribute information from the underlying data record for consideration;
  allowing, during display of the predetermined attribute information, designation of a further data record of interest; and
repeating the processor implemented steps utilising an identifier of the designated data record.

In a sixth aspect, the present disclosure relates to a system for presentation and visual navigation of a data set including related data records, the system comprising:
a processor arranged for access to a data set including a plurality of related records;
the processor associated with an interface and further arranged to:
  receive via the interface an identifier of a data record of interest from within the data set;
  determine records in the data set that are associated with the identified data record of interest, including allocation of a score to each data record determined from the degree of connectivity with other data records in the data set; and
  generate on the interface, a visual representation of the identified data record and associated data records in a graph structure wherein the data records are nodes that are interconnected by links each representing the association between respective records, thereby forming a network;
wherein:
  the network visual representation includes phantom nodes, the phantom nodes being associated data records that are indirectly connected by links to the identified data record, and representing data records having a score below a predetermined threshold are represented, as are links with said phantom nodes, at a lower display intensity than data records having a score at or above the threshold.

In a seventh aspect, the present disclosure relates to a system for presentation and visual navigation of a data set including related data records, the system comprising: a processor arranged for access to a data set including a plurality of related records; the processor associated with an interface and further arranged to:
  receive via the interface, an identifier of a data record of interest from within a data set having at least some related data records;
  determine records in the data set that are associated with the identified data record of interest;
  generating on the interface, a visual representation of the identified data record and the associated data records in a graph structure wherein the data records are nodes that are interconnected by links each representing the association between respective records, thereby forming a network;
  display, upon selection of a node representing a data record, underlying details of predetermined attributes from the data record for consideration;
  effect, during display of the predetermined attribute information, copying of said attribute information into a separate zone of the visual representation.

In an eighth aspect, the present disclosure provides computer readable media containing sequences of instructions which, when executed by one or more processors, executes the steps of a method in accordance with any one of the second to forth, or tenth aspects.

In a ninth aspect, the present disclosure provides transmission or reception of a computer data signal comprising at least one encoded sequence of instructions from the eighth aspect.

In a tenth aspect, a computer implemented method of determining a similarity score of at least one pair of data records is disclosed. The method comprising the steps of:
  identifying at least one pair of directly connected data records in the data record set;
  calculating a connection strength between the directly connected data records wherein the connection strength is calculated by determining the number of shared connections between the pair of directly connected data records;

calculating a connection distance between the directly connected data records, wherein the calculation of the connection distance is dependent on the connection strength;

identifying a pair of indirectly connected data records, wherein indirectly connected data records are connected via at least two pairs of directly connected data records; and calculating the similarity score of the pair of indirectly connected data records in dependence on the connection distance between the directly connected data records, wherein the similarity score allows a user to identify pairs of data records that disclose similar concepts.

In some forms, the method of determining a similarity score of at least one pair of data records includes the step of:
calculating the similarity score of the at least one pair of directly connected data records in dependence on the connection distance between the directly connected data records.

In some forms, the method of determining a similarity score of at least one pair of data records includes the step of:
calculating a connection strength for the directly connected data records, wherein the calculation of the connection distance is dependent on the connection strength.

In some forms, the connection strength is calculated by:
identifying further data records that are directly connected to both of the data records in the at least one pair of directly connected data records to derive a count of the total number of connections between data records of the at least one pair; and
calculating the connection strength in dependence on the count.

In some forms, the method of determining a similarity score of at least one pair of data records includes the step of:
setting a predetermined level for the similarity score between the at least one pair of indirectly connected data records;
removing the at least one pair of indirectly connected data records that are below the predetermined level; and
ranking the remaining at least one pair of indirectly connected data records in dependence on the similarity score.

In some forms, the data records are patents, the patents being directly connected in that they share a citation.

Also disclosed herein is a system for ranking, reducing and presenting at least one pair of data records, the system comprising:
a processor configured to calculate the similarity score of at least one pair of indirectly connected data records, wherein the at least one pair of indirectly connected data records are ranked in dependence on the similarity score;
a processor for reducing the at least one pair of indirectly connected data records, the reducing being dependent on the ranking of the at least one pair of indirectly connected data records; and
a display means for presenting the reduced at least one pair of indirectly connected data records, the presentation allowing the user to identify pairs of data records that disclose similar concepts.

In some forms, the system further comprises an attribute filter, the attribute filter operable to remove data records from the presentation.

In some forms, reduction of the data records caused by operation of the attribute filter does not require of regeneration of the presentation.

In some forms, reduction of the data records caused by operation of the attribute filter temporarily removes the data records from the presentation.

In some forms, the attribute filter also removes links associated with the removed data record to further reduce clutter from the presentation.

In some forms, the attribute filter is a percentage slider operable by a user to remove the data records.

BRIEF DESCRIPTION OF THE DRAWINGS

Notwithstanding any other embodiments that may fall within the scope of the present disclosure, several embodiments of the present invention will now be described, by way of example, with reference to the accompanying drawings in which.

DETAILED DESCRIPTION OF THE INVENTION

Figure 1:
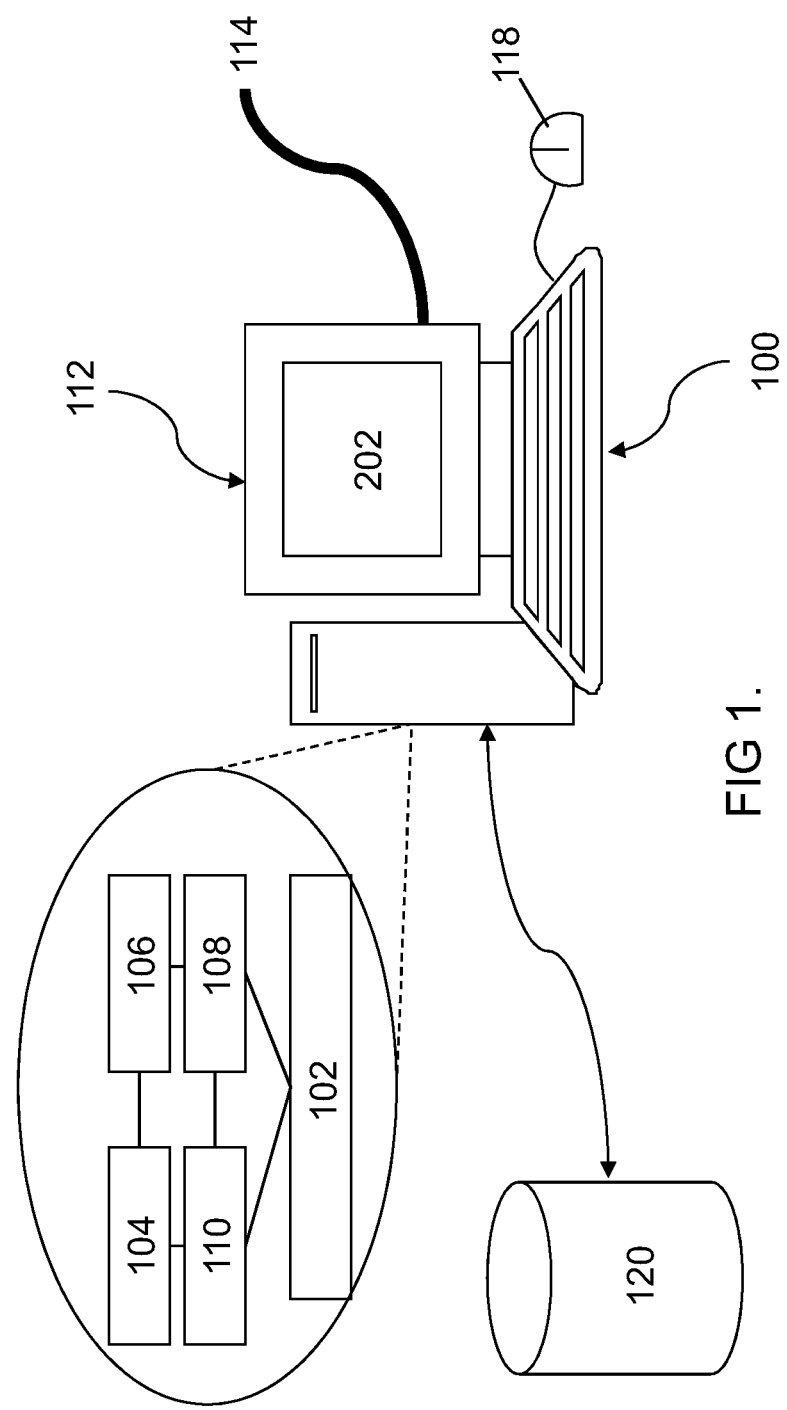
FIG. 1 is a schematic block diagram of a system for presentation and visual navigation of a data set including related data records, in accordance with one embodiment of the present invention.

Referring to FIG. 1, an embodiment of the present invention is illustrated. This embodiment is arranged to provide a system for analysing and visualising data, comprising an interface for receiving user instructions and displaying information, and a processor for executing user commands, including commands to collect data in a suitable manner for further processing. In this example embodiment, the interface and processor are implemented by a computer having an appropriate user interface. The computer may be implemented by any computing architecture, including stand-alone PC, client/server architecture, "dumb" terminal/mainframe architecture, or any other appropriate architecture. The computing device is appropriately programmed to implement the embodiment described herein.

In this embodiment, there is provided a local database containing a set of records, such as patent data records. In the embodiment described herein, the records may have been selected and collated in accordance with a co-pending application filed by the applicant, entitled "A system, method and computer program for preparing data for analysis", published as US 2012/0011132, which is herein incorporated by reference. In another embodiment, it will be understood that the system may access a separately located and/or administered database containing patent data records. The database may be separately administered by a Government authority or third party.

Referring to FIG. 1 there is a shown a schematic diagram of a system for visualizing network data which in this embodiment comprises a computer which can include any client or server machine. In this embodiment the computer is a server 100. The computer, such as server 100, comprises suitable components necessary to receive, store and execute appropriate computer instructions. The components may include a processing unit 102, read-only memory (ROM) 104, random access memory (RAM) 106, and input/output devices such as disk drives 108, input devices 110 such as an Ethernet port, a USB port, etc., a display 112 such as a liquid crystal display, a light emitting display or any other suitable visual display unit, and communications links 114. The server 100 includes instructions that may be included in ROM 104, RAM 106 or disk drives 108 and may be executed by the processing unit 102. There may be provided a plurality of communication links 114 which may variously connect to one or more computing devices such as a server, personal computers, terminals, wireless or handheld computing devices. At least one of a plurality of communications links may be connected to an external computing network through a telephone line, co-axial cable, optical fibre, wireless connection or other type of communications link.

The server 100 may include storage devices such as a disk drive 108 which may encompass solid state drives, hard disk drives, optical drives or magnetic tape drives. The server 100 may also use a single disk drive or multiple disk drives. The server 100 may also have a suitable operating system 130 which resides on the disk drive 108 or in the ROM of the server 100. The system has a database 120 residing on a disk or other storage device which is arranged to store at least one record 122 providing, in at least one embodiment, a plurality of records containing patent related data. The database 120 is in communication with an interface (comprising one or more of the abovementioned components), which is implemented by computer software residing on the system 100.

An interface 202 provides a facility by which a user may input commands, instructions or requests to the server 100 for execution or processing, including an arrangement of hardware devices and software functionality. The interface is in connection with the processor and is arranged to facilitate both the entering of user commands and the display of information to the user. The interface 202 may be implemented with input devices such as keyboards 116, touch-pads, a mouse 118 or other pointing devices and, in another example embodiment, the interface 202 includes software modules which may be arranged to receive inputs, requests or data through a network connection, including Ethernet, Wi-Fi, Fire-Wire, USB or the like. The interface 202 of the present embodiment provides for the appropriate visualisation of patent related data, including before, during and/or after substantive analysis.

The following description provides a series of visualisation techniques utilised by the system to present, navigate and interactively analyse large data sets. While the techniques are described as discrete components, it will be understood that the techniques may be used in conjunction to provide a rich and deep visualisation of any relevant data set. The system and associated software application allow the user to apply the techniques in any suitable sequence, to provide the user with the most appropriate visualisation for their particular requirements.

Before describing the techniques in detail, it is instructive to provide some definitions, so that the reader may better understand the background to these techniques.

First, the techniques which are described herein apply principally to "network" visualisations. A network visualisation is a visual map or diagram which displays a plurality of entities and the relationship between the entities. For example, a map of train stations is a good illustration of a simple network map. Each dot or "node" represents a train station and each line or "link" represents a rail connection between the two stations. By using simple graphical devices such as nodes and links, a large amount of information about an entire rail network can be conveyed in a small space, and more importantly, in a manner that is intuitively understandable to a user (e.g. a train commuter). The map/diagram may be provided in a two dimensional format, or a three dimensional format, depending on the relative complexity of the data that is being displayed.

Secondly, in the context of the embodiment described herein, patent data is visualised using a network visualisation technique. Each node represents a patent or patent application, and each link represents a common shared attribute value, such as a common citation (i.e. a backward citation or forward citation).

Lastly, it will be understood that any suitable visualisation techniques/software components may be utilised to create a visual image of the network.

With these points in mind, the various techniques utilised by the system and method, which may be implemented at least in part as a software application, an embodiment of which will now be described with reference to FIGS. 2 and 3.

Figure 2:
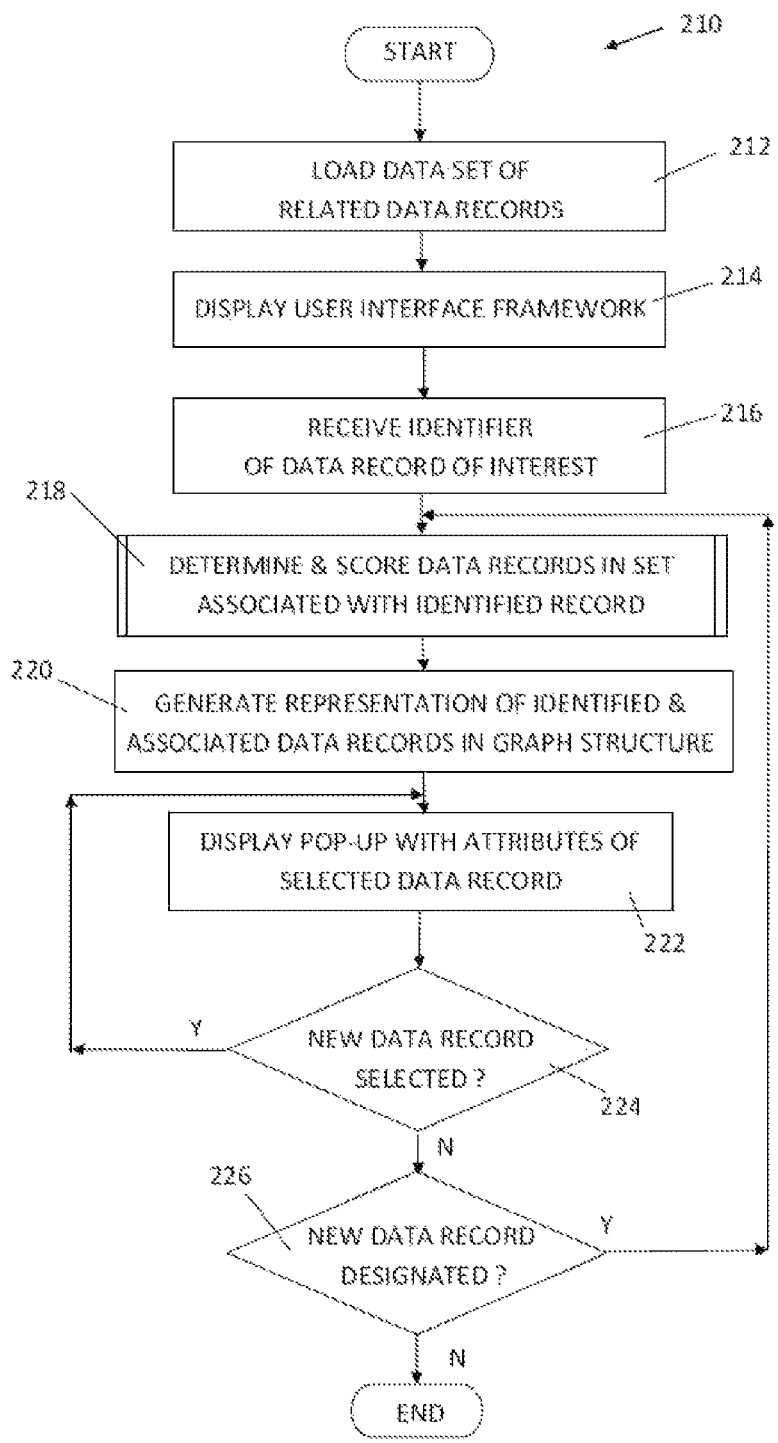
FIG. 2 is a flow diagram of a method for presentation and visual navigation of records in a data set in accordance with one embodiment of the present invention.
Figure 3:
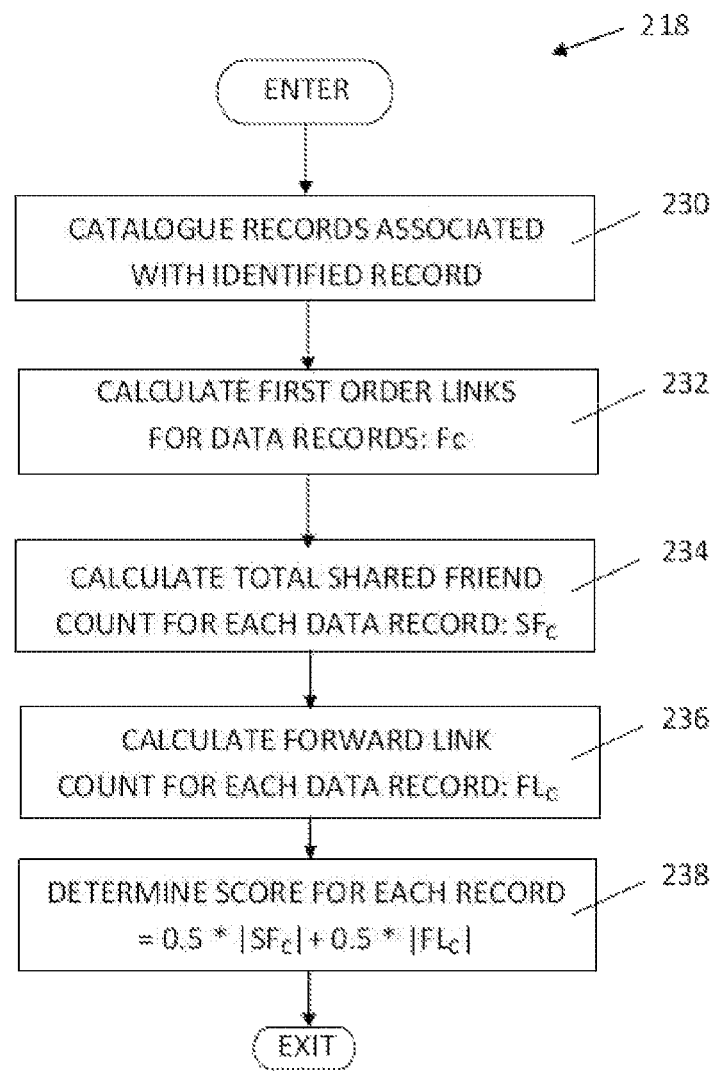
FIG. 3 is a flow diagram of a method for calculation of a score for individual records in the data set.
Figure 4:
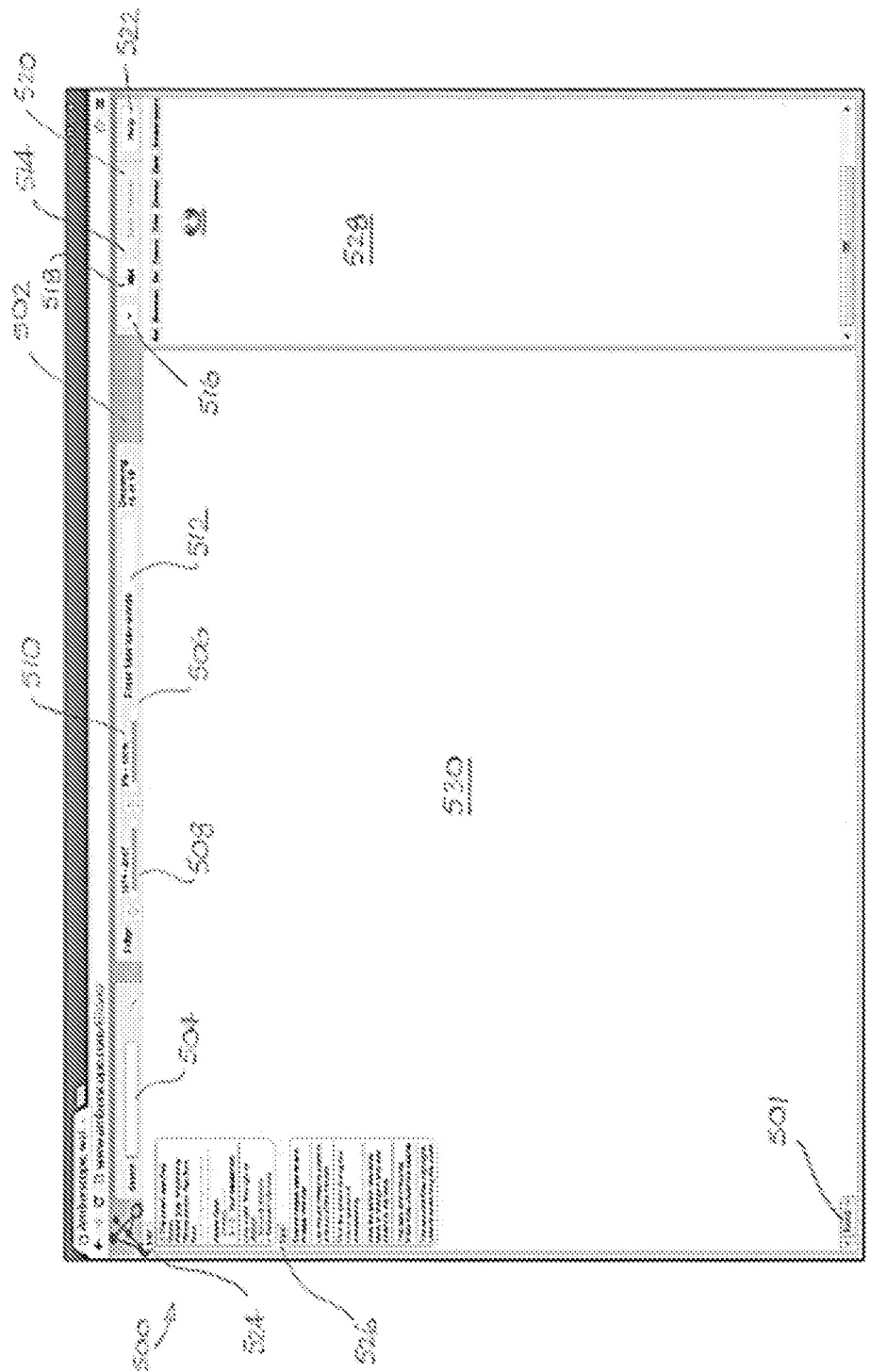
FIG. 4 depicts a framework for a visual interface in accordance with one embodiment of the present invention.

The main software module executes a method having a process flow 210 as depicted in FIG. 2, commencing in step 212 with loading a data set of related records, for example a set of patent data records from database 120. In step 212 an interface frame work 500, as further described below in relation to FIG. 4 is displayed, for example on visual display unit 112. The information presented to a user via the framework prompts entry of an identifier of a data record of interest, such as a patent record, through interface 202 which identifier is received in step 216.

Figure 5A:
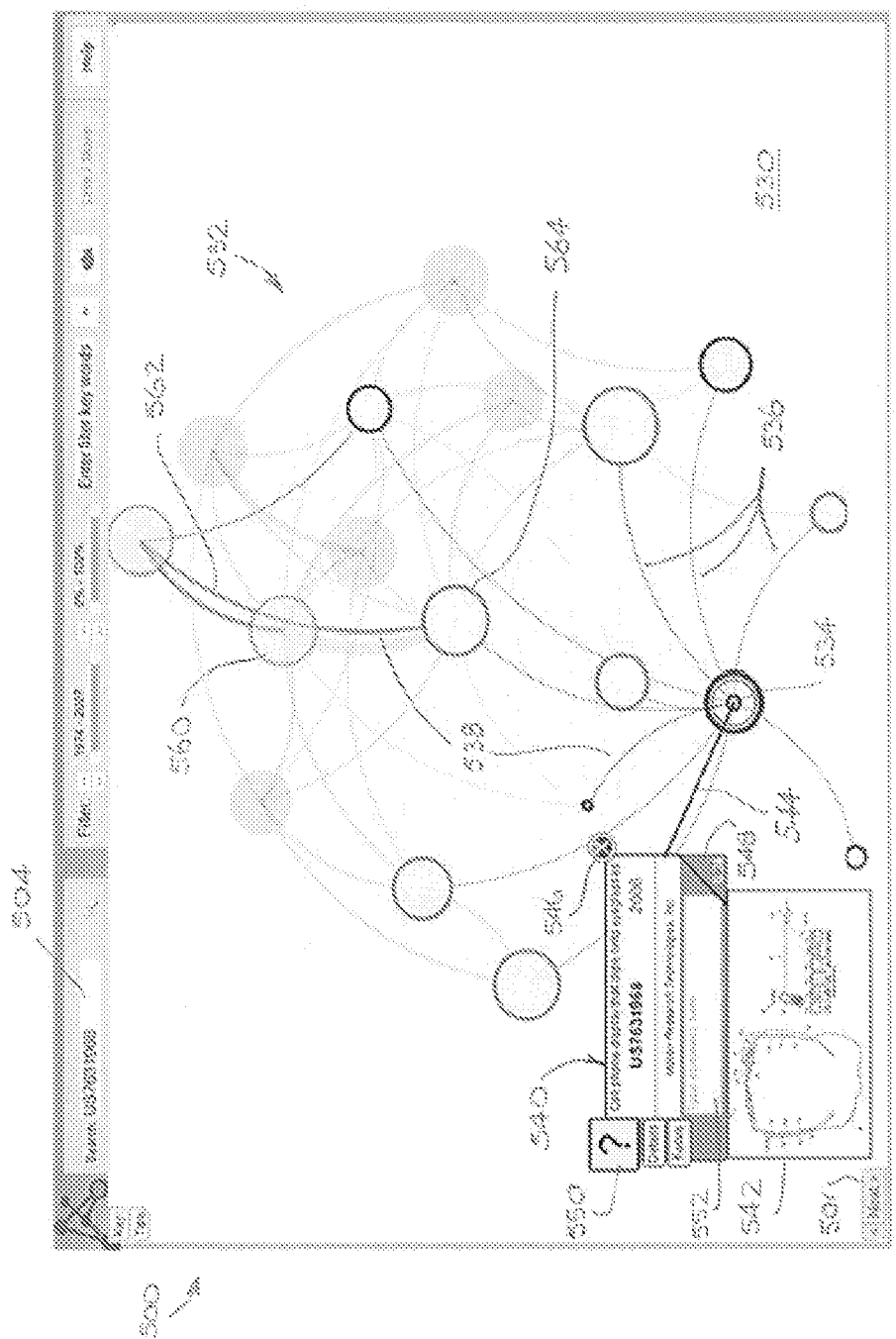
FIG. 5A depicts a visual representation of a network of related data records from a first example data set within the framework shown in FIG. 4.

In step 218, a sub-module is called which passes the identifier for the purpose of determining data records in the set that are associated with the identified record and, as a consequence allocates, a score to each associated record (and the identified record) determined from the degree of connectivity with all other records in the data set. This will be further described in relation to FIG. 3, below. In step 220, and utilizing the associations and scores determined in step 218, the process generates a visual representation of the identified and associated data records in a graph structure, wherein the patent records are dots or "nodes" and the associated records are connected by arcuate lines or "links". An example of such a visual representation 532, which has used U.S. Pat. No. 7,631,968 as the identified or initially selected patent data record, is depicted in FIG. 5A. Additional features of the example representation are described below in relation to FIG. 5A, including a patent summary box 540 which contains selected attributes of the underlying selected patent record caused to be displayed in step 222. In the first pass of method step 222, the selected record defaults to the identified record, pending further user input.

Upon conclusion of step 222, the process actively awaits such further input from the user. In the embodiment, "selection" of patent records at decision step 224 is effected by the user navigating through the network by moving from one node to another node using a pointing device, such as mouse 118, or by a pre-selected key stroke/s on keyboard 116. If required the framework can include a "Next" button 501, by which the user a guided to the patent record having the next highest "score." This is helpful in approaching networks with relatively tightly grouped nodes, as will be further explained in relation to FIG. 7. Upon selection of a new node, for example node 564, a new pop-up patent summary box 540a appears (see the enlarged view in FIG. 6B for U.S. Pat. No. 6,349,001). The summary box 540a contains predetermined attributes from the underlying patent record as a result of process flow passing back to step 222.

The operation at decision step 226 concerns the designation of a new data record (as distinct from mere display of attributes) for re-generation of a fresh visual representation.

Figure 6A:
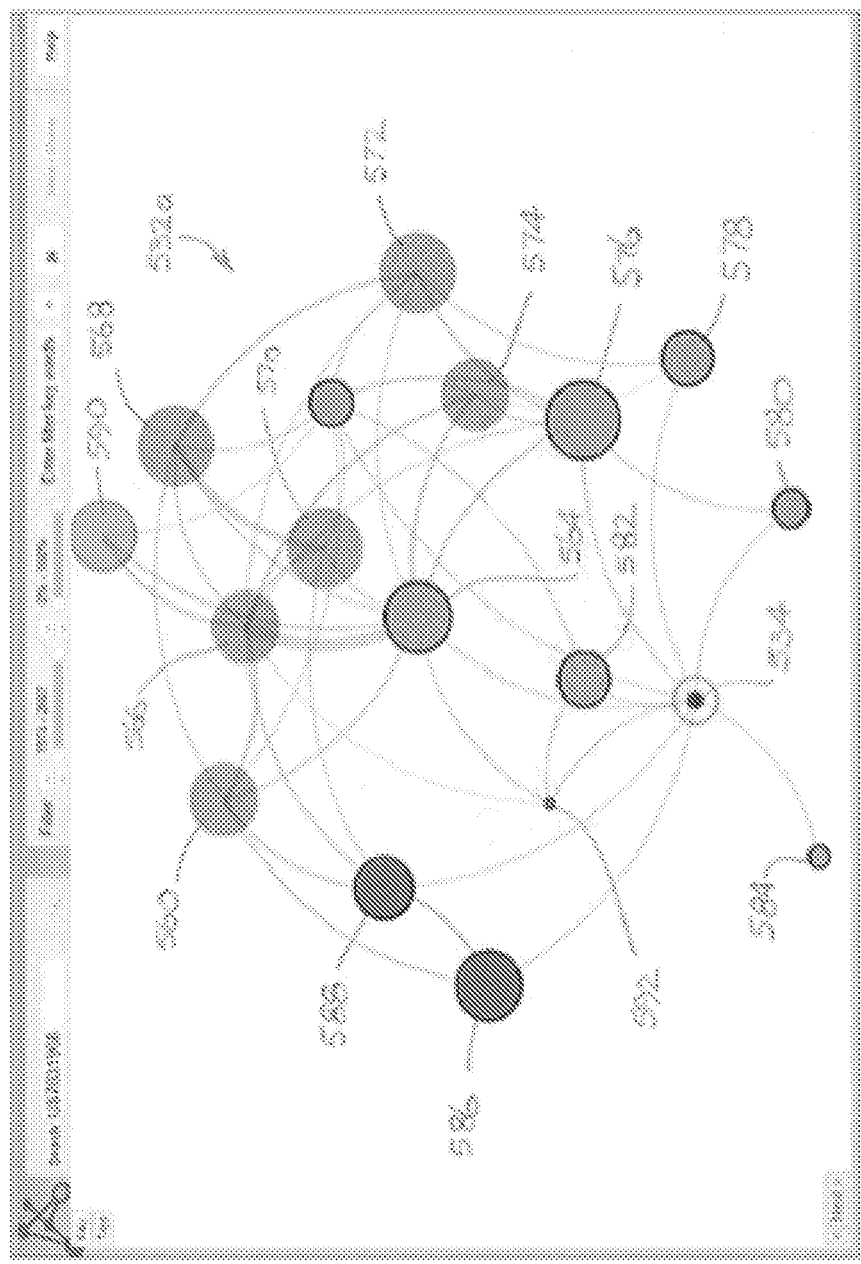
FIG. 6A depicts a visual representation of the network of data records of FIG. 5A which have been rated by a user.
Figure 6B:
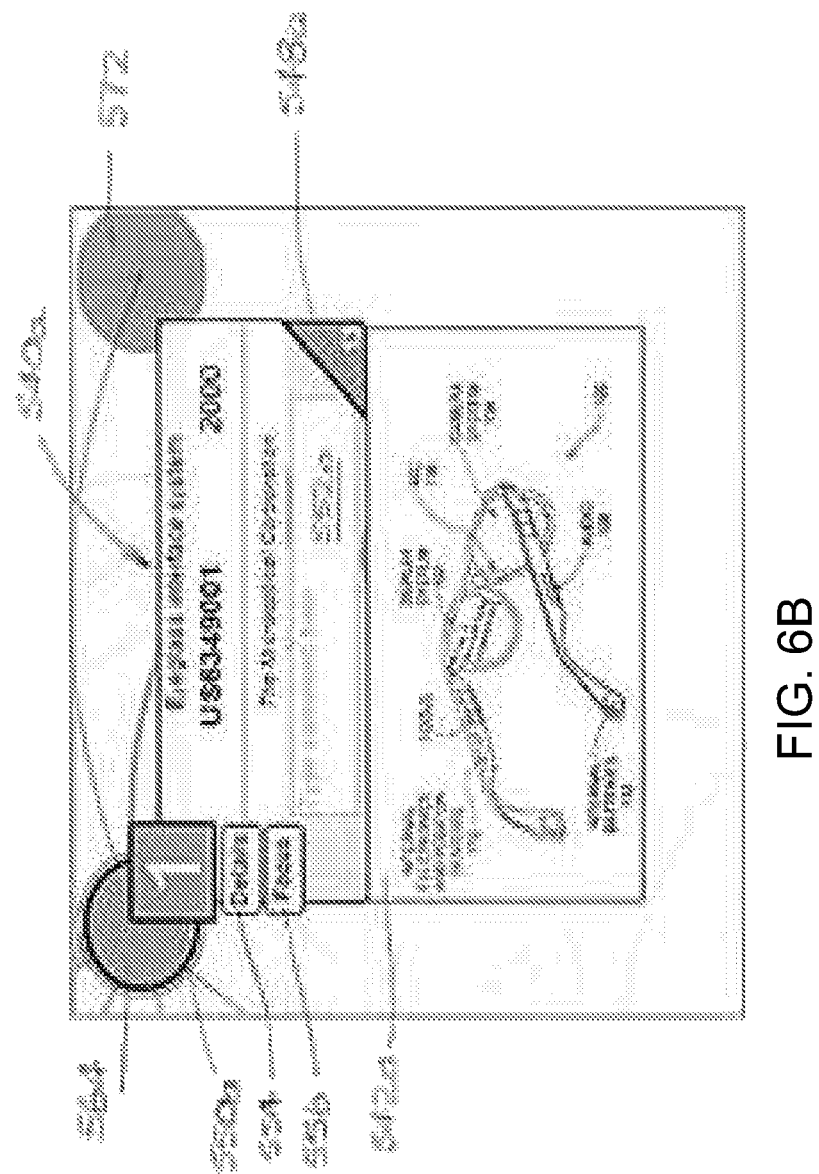
FIG. 6B depicts an enlarged portion of the visual representation of FIG. 6A wherein data of a selected node has been rated.
Figure 7:
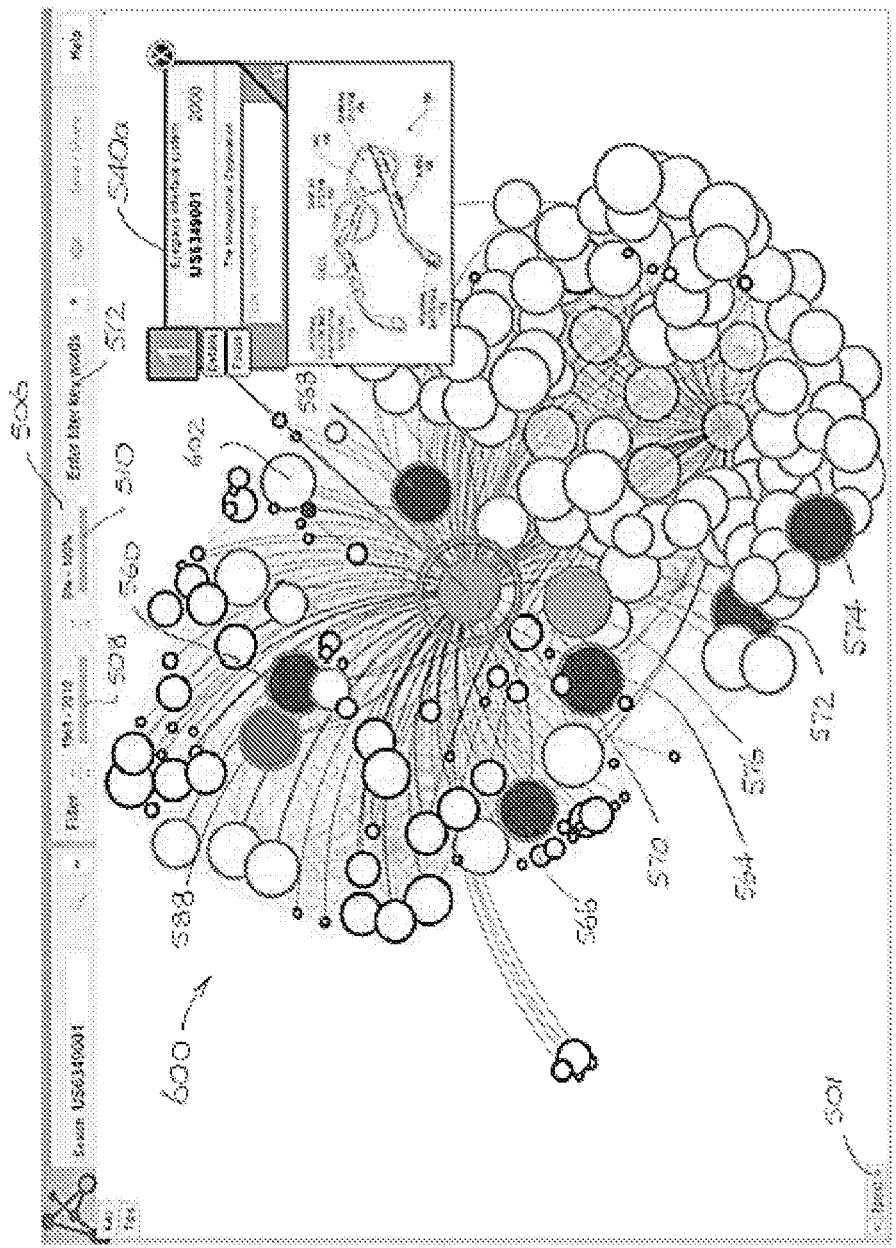
FIG. 7 depicts another visual representation of another network of related data records from a first example data set, employing a different focus record being the record summarised in FIG. 6B.

This is effected in the embodiment and with reference to FIG. 6B, to the "Focus" button 556 provided in the patent summary box 540a, with the result as shown in FIG. 7. It will appreciated that the process may include further decision steps to suit display requirements. For example, a decision step for filtering the display may be provided intermediate steps 224 and 226 which is triggered by user adjustment of the year, percentage or keyword filters from a menu bar 506, and control passing back to step 220. This will effect adjustments to the (already displayed) patent network graph resulting from the user required filter/s being applied to the visual representation which do not require re-generation. By way of example, setting the lower bound of the year to 1990 will exclude nodes relating to all records for patents issued in 1989 or either from the representation, including all links from the pre-1990 patent to the remaining patent records.

We turn now to a discussion of the process relating to the sub-module for determining data records in the set that are associated with the identified record and, as a consequence allocates, a score to each associated record (and the identified record) determined from the degree of connectivity with all other records in the data set. More particularly we will discuss how the score may be deterministically calculated. In terms of the embodiment, the connecting attribute is citations and accordingly nodes are linked together in the representation on the basis of citation, preferably links have a first appearance for forward citations and another contrasting appearance for backward citations. Turning to the process depicted in FIG. 3, the first step 230 in sub-process 218 involves cataloguing for each data record the links created by citation attributes which may involve a many-to-one relationship, a many-to-many relationship or one-to-many relationship in each case.

The subsequent steps involve the calculation of some intermediate metrics about the scale and depth of connections with other data records. Second step 232 requires the calculation for each data record of the number of first degree connections: Fc, conveniently referred to as "friends." Third step 234 then requires the calculation for each pair of first degree connections (or each pair of friends) of the number of first degree connections that those friends have in common ("friends of friends"), summed across all pairs of friends SFc and conveniently referred to "total shared friends." By way of example if a particular record had just 2 "friends" (i.e. first order citation links) and each of those friend 2 records themselves had 5 friend records in common, the total shared friends would calculate as: 2×5=10.

The next calculation step 236 then involves counting for each data record the number of forward links, i.e. to temporally later records, to provide a forward link count: FLc. Optionally, the forward link count is subject to a temporal weighting curve, which discounts the older forward citations. An example of weights for a suitable weighting curve is set out below in Table 1.

TABLE 1

| Forward link discounts | | | | | | | | | |
|---|---|---|---|---|---|---|---|---|---|
| 1 yr | 2 yrs | 3 yrs | 4 yrs | 5 yrs | 6 yrs | 7 yrs | 8 yrs | 9 yrs | 10 yrs |
| 1.0 | 1.0 | 1.0. | 1.0 | 0.84 | 0.7 | 0.6 | 0.52 | 0.46 | 0.4 |
| 11 yrs | 12 yrs | 13 yrs | 14 yrs | 15 yrs | 16 yrs | 17 yrs | 18 yrs | 19 yrs | 20 yrs |
| 0.36 | 0.32 | 0.286 | 0.26 | 0.24 | 0.22 | 0.2 | 0.18 | 0.156 | 0.144 |

Recent forward citations in a patent record example, generally suggest recent activity, which is good. But if a patent is 15 years old or more, and all of its forward citations were soon afterwards, this indicates that there is no recent related activity, and so such forward citations should be discounted heavily, such by this temporal weighting. A further adjustment, particularly for patents less than 5 years old, is to pro-rata the forward citations up—for example:

$$\text{Pro-rata age corrected } FLc = \text{Age corrected } FLc * 5/3 \quad (1)$$

Finally in step 238, the score is then the factored sum of two components SFc and FLc subsequent to normalisation against the average value for records in the data set, for example (in the case of patent records) patents issued in the past 20 years.

$$\text{Score} = f1 * |SFc| + f2 * |FLc| \quad (2)$$

where f1=f2=0.5

The score for each record calculated by this process has been found by the applicant to efficiently reflect the level of connectivity of data records in a data set including linked records. Returning to FIG. 2 and generally speaking, applicant has found that this deterministic score provides a basis for generating the representation of the graph structure of related records effected in step 220, and as shown in FIG. 5A. A rough guide for display purposes is to show nodes no more than about 3 links back from the identified record of interest. By way of further example, a calculation of the appropriate data record score used to provide a threshold for the so-called "phantom nodes" described further below (see for example node 560 in FIG. 5A) is effected in the context of the scores of the data records to be displayed in a particular representation, i.e. the threshold is somewhat display data context sensitive.

FIG. 4 shows a framework 500 for a visual interface that may be presented on a display 112 and for interaction with the user via input devices, such as a keyboard 116 and mouse 118, in accordance with a first embodiment. The framework 500 includes at an upper edge a menu bar 502, having (moving left to right) a "Search" input field 504 for receiving an identifier of an initial data record of interest, an attribute filter sub-menu 506 having sliders for indicating a desired year range 508 (e.g. 1974-2007) and score percentage 510 (to be described further below), together with an alpha-numeric input field here in the form of a "key word" field 512. A visualisation submenu 514 is provided on the right side of the menu bar, having a refresh play/pause button 516, a local display magnification button here in the form of a fish-eye lens 518, a "Save/Share" results button 520 and a "Help" button 522.

A main display zone 530 reserved for a visual representation of a network of data records is bordered to the left by a "Key" button 524 and by a "Tips" button 526, together with associated drop-down lists. Upon actuation of the Key button, the interface lists particular icon sizes and appearance codes, such as colour, applied to elements of the visual representation, and by actuation of the Tips button 526 a further drop-down list suggests actions currently available to a user. A user selected results zone 528 borders the right side of the main display zone 530, which in the present embodiment is arranged to be displayed in the form of a list. The list can include, for example, each data record's identifier together with other columns for attributes such as user relevance ranking, document title, owner, date and system calculated score (termed "global score" in a specific embodiment). The operation of the interface will now be described in relation to a particular example.

Example—U.S. Pat. No. 7,361,968

A first example of the operation of the presentation and visual navigation method and system of the first embodiment is now described in relation to FIGS. 5A to 7, wherein the set of data records include US patent data. The visual representation 532 of the network of data records is generated following the entry of "U.S. Pat. No. 7,361,968" into the search field 504 is shown in FIG. 5A. Here the initial focus of the search of US patent data records is U.S. Pat. No. 7,361,968 (968) for the invention entitled "Cell phone display that clips onto eyeglasses" that is assigned to Motion Research Technologies, Inc. and issued in 2006. In the representation 532, data records are nodes that are interconnected by links to nodes of associated data records and thereby form a patent record network, with nodes (records) and links (associations) arranged in a graph structure. In the embodiment, the associated data records are those of patent documents that were either listed during prosecution of the application ("backward citations") for the patent or later applications which listed the patent during their prosecution (i.e. referenced by, sometimes called "forward citations"). It will be noted that the key and tips icons 524, 526, together with the user results/audit trail zone 528 have been minimised in the present interface in order to provide maximum space for the main display zone 530 on display hardware.

Each node is shown as a dot that represents an underlying patent record, with the dot 534 surrounded by a contrasting (such as coloured red) circle, here being the '968 patent, to indicate the node of the 'focus' patent of the patent network visual representation. All of the patents associated with the '968 patent are interconnected nodes of the network, wherein the nodes are represented by dots in a light grey colour with links represented by arcuate lines of contrasting appearance, such as colours. In some embodiments purple lines 536 are utilised to show backward citation links being a first sub-set of patent record associations, and green lines 538 are utilised to show forward citation links being a second sub-set of patent record associations. Suitably the size or area of the dots represent a score which is determined from the relative strength of interconnections to each patent, which score effectively indicates the influence (interconnectedness) of the respective patents in the network. In the present example, the '968 patent has a score of 0.24. This is a lower than average score in the embodiment, since the average interconnection strength of all US patents granted over the last 20 years is arranged in the determination to be unity (1), by normalising the results. If required, the thickness of lines may also be arranged to reflect the strength of connections between two particular nodes, such as by counting other data records that are associated in common with a pair of patent records and sometimes referred to as "shared friends".

Upon initial generation of the patent network representation 532, a pop-up summary box 540 containing pre-selected attribute information of the patent, here "focus" patent '968, and the patent's score is presented. Here the attribute information is selected to include the patent title, number, year of grant, assignee/owner name, and (in a subsidiary box 542 showing) any image available from the patent record. An image is considered a particular powerful way for a user reviewing many records in quick succession to either quickly dismiss the record as "not relevant" or make a further inquiry into the details of the record (discussed in relation to FIG. 6B below). The summary box 540 may be dragged to any desired position in main display zone 530, for example to reveal obscured nodes, but remains anchored to the node by a straight line 544 to minimise confusion. An icon in the form of a circle containing a cross 546 at the top right corner may be actuated to "close" the summary box 540. In an alternative arrangement, the patent summary box 540 may be arranged to appear in a fixed position, for example the bottom right-hand corner of the display. One suitable fixed position can be provided at the bottom of a shortened user results zone 528 (see FIG. 4). The score of the '968 patent, 0.24 as mentioned above, is display at the lower right corner 548 of the summary box.

The patent summary box 540 further includes (at a top left corner) a rating button 550, which may be conveniently cycled, by user actuation, through a number of pre-set ratings. The user ratings applied to a patent record may also result in selective colour coding of the respective node, for example search relevance including: rating "0" for not relevant—with node colour green; rating "1" for potentially relevant—with node colour orange; and rating "2" for relevant—with node colour magenta. Reference is made to FIG. 6A which depicts the patent network representation 532*a* with relevance of all patents/nodes rated. A user accessible "comments" field 552 is also provided within the patent summary box, which allows for insertion of free text by the user as desired. Furthermore, the interface of the embodiment is configured to capture user ratings, comments and brief details on any patent, for example by copying pre-selected patent details to (the currently minimised) user results zone 528. These captures, suitably arranged in an ordered list, can form a history of which records in the representation have been reviewed. Whilst currently patents can be rated from 0 to 2, this can be expanded as required, depending on the nature of the underlying data.

Returning to FIG. 5A, the question mark "?" in the patent rating button 550 of the patent box 540 shows that the '968 patent, whose summary is currently displayed, has not yet been rated by the user. A further visual feature of the embodiment is to effect a change in the colour of nodes which have been visited (and summary viewed, but not rated) from light grey to a contrasting light colour, such as yellow. By way of linking this visual feature to user rating functionality, the background colour of the rating button 550 can also be made the same, so yellow in this example, when the patent record is un-rated. Visits may merely require the cursor to remain over a node for a pre-set period (also causing the patent summary box 540 to be displayed). In an alternative form, a user actuation—such as a mouse click—on a node of interest may be required to result in display of the summary box and thus constitute a visit.

The visual representation 532 also shows nodes of the more highly scored patents that are connected to the patents that are themselves connected to the '968 patent. These indirectly connected patents could be regarded as influential 'friends of friends'. In terms of the visual representation, the nodes are referred to as "phantom" nodes since they are presented at lower display intensity, and preferably feature transparency. Accordingly a phantom node, such as node 560, can easily be identified as the nodes wherein underlying links 562 are visible in FIG. 5B.

Figure 5C:
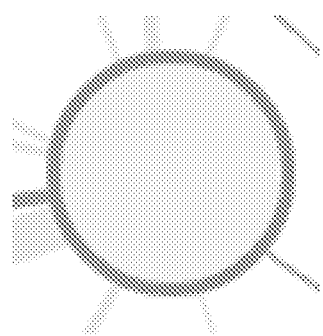
FIG. 5C depicts a visual representation of a node directly connected to the focus record.
Figure 5B:
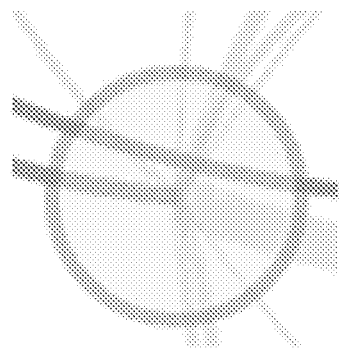
FIG. 5B depicts a visual representation of a "phantom" node indirectly connected to the focus record.

In contrast, as opposed to the full intensity nodes, such as node 564, wherein connection lines, such as link 538, are hidden behind the dots for the directly connected nodes, as shown in FIG. 5C.

The applicant has found that the patent records underlying phantom nodes, such as node 560, can be very valuable. Such patent records can contain potentially relevant disclosures that were not considered during official examination but still may be relevant to consideration of an invention being searched.

Figure 11:
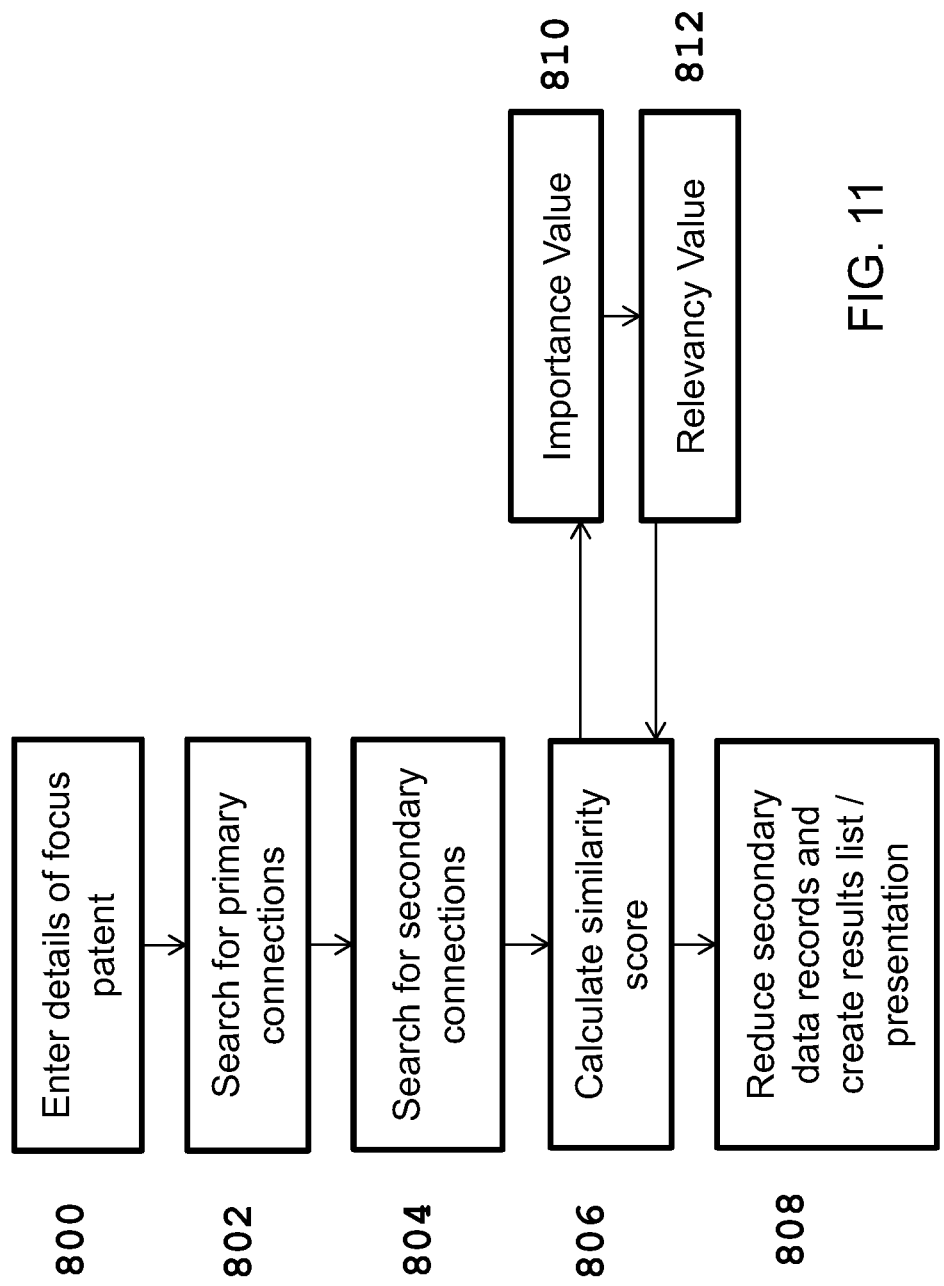
FIG. 11 depicts a method for calculating the similarity score of ghost patents.
Figure 12:
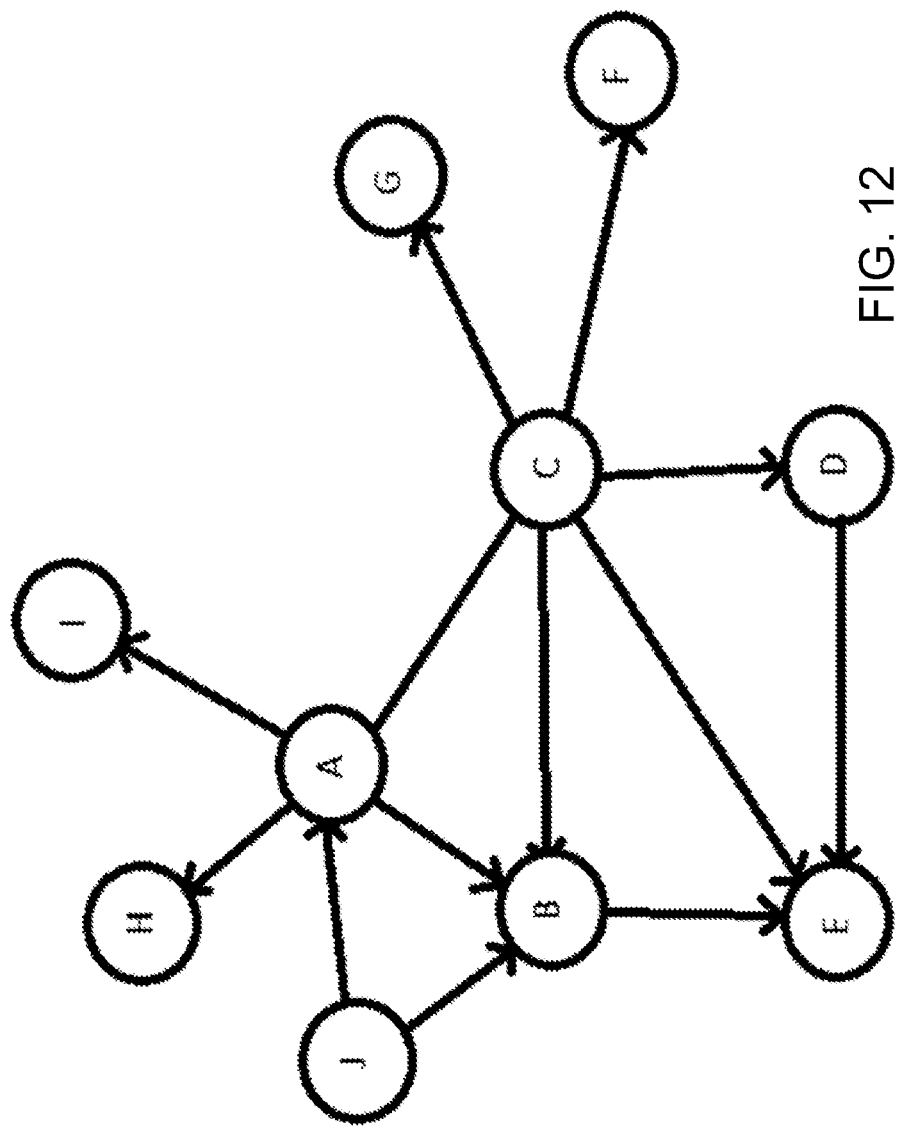
FIG. 12 depicts a visual representation of a data map.

Turning now to FIG. 11, the computer implemented method of determining a similarity score of a plurality of data records with a target data record will be described in detail with reference to patent documents. At step 800, a target data record, in the form of a focus patent, is identified from a data set, the data set having at least some related patents. In one form, a user enters the application number of a patent. At steps 802 and 804, patents within the data set having primary and secondary connections with the focus patent are identified to form a data record map, such records being primary and secondary data records. The primary data records, in the form of first order patents, are the patents that are directly connected to the focus patent. Patents may be directly connected in that they share a citation. The secondary data records, in the form of second order patents, are the patents that are directly connected to the first order patents. They are called second order patents because they are 'twice' separated from the focus patent. In FIGS. 11 and 12, the patents are connected in that they share a citation. The citation may be a forwards or backwards citation, depending on the reference patent. The second order patents, in the form of 'phantom nodes' or 'ghost patents', may be very similar or closely related to the focus patent. For example, the second order patents may be in the same technical field or disclose a similar concept to the focus patent. Many searching techniques miss the second order patents. For most patents, there will be a very large number of associated second order patents. It is therefore difficult to determine which second order patents should be presented to the searcher. FIGS. 11 and 12 detail a method for calculating the similarity score of the second order patents.

At step 810, the 'importance value' of the second order patents is calculated. The importance value takes into account the strength of the connection between a first order patent a second order patent, the strength of the connected first order patent, the strength of the connection between second order nodes in the data map (for example second order patents that share a citation but do not both share a citation with a first order patent) and the strength of this connected second order patent. The importance value gives a good indication of the 'importantness' of the second order patents, and is described in further detail by way of an example shown in FIG. 12. FIG. 12 shows a simple data map, where A is the focus patent. Patents B, C, J, H and I are first order patents in that they share a citation with A. The arrows are indicative of the direction of the citation. Patens E, D, F and G are second order patents in that they share a citation with the first order patents that are directly connected to the focus patent. There are a number of ways to determine the strength of the connection between connected patents. One method is to calculate the 'link value'. The link value is calculated by determining the number of shared connections between a pair of connected patents. For example, the link between patents A and B could be assigned a link value of 3, in that the pair A-B share 2 common connections and are directly connected. Table 2 details the link value for the first order patents in FIG. 12.

TABLE 2

Link Values between the focus patent and first order patents

| Connection | Link Value |
|---|---|
| A-I | 1 |
| A-H | 1 |
| A-J | 2 |
| A-B | 3 |
| A-C | 2 |

The strength of the first order patent that a second order patent is connected to may be a predetermined value, in the form of a 'global score', assigned to each patent in the data set before searching is performed. The global score may be related to the data set, not the data map, in that it is a predetermined value calculated for each patent in the data set before a focus patent is identified. Factors that may be included in the global score include a patents age, how many forwards citations it has and the citation rate over time. In some forms, the citation rate over time is normalised to allow relatively recent patents to have a high global score. For a network of patents, when a new patent is added to the data set, the global score of affected patents may be updated before a search is performed. The strength of connections between two second order patents may be calculated in much the same way that link values were calculated between first order patents and the focus patent. Table 3 details the link value for the second order patents in FIG. 12.

TABLE 3

Link Values between first order patent and second order patents

| Connection | Link Value |
|---|---|
| C-G | 1 |
| C-F | 1 |
| C-D | 2 |
| C-B | 3 |
| B-E | 2 |
| C-E | 3 |
| D-E | 2 |

The strength of the second order patents, again the global score, is also taken into account when calculating the importance value of the second order patents. The four factors (strength of the first order patent, strength of the link between first and second order patents, strength of the second order patent and the strength of the link between second order patents) may be then given a weighting and an overall importance value is calculated for each of the second order patents. Table 4 details an example calculation of the importance value for second order patent E in FIG. 12 (note that the global score of the patents has been randomly assigned).

TABLE 4

Importance Value of E

| General Factors | Specific Factors | Value | Weighting | Score |
|---|---|---|---|---|
| Link value between first order node and second order node | Link Value B-E | 2 | 0.5 | 1 |
| | Link Value C-E | 3 | 0.5 | 1.5 |
| Global score of connected first order node | Global score of B | 3.2 | 0.25 | 0.8 |
| | Global score of C | 0.32 | 0.25 | 0.08 |
| Link value between second order node and another second order node | Link Value D-E | 2 | 0.15 | 0.30 |
| Global score of connected second order node | Global score of D | 6.1 | 0.1 | 0.61 |
| Importance of 'ghost patent' E | | | | 4.29 |

It should be noted that the four factors used by way of example with reference to FIGS. 11 & 12 are indicative only. Other methods of calculating the importance value, whereby three or less of the factors are used may also be useful. However, utilizing all four factors gives a good indication of the 'importantness' of the second order patents.

At step 812, the relevance value is calculated for each of the second order patents. The relevance value gives a good indication of the relevancy of the second order patents to the focus patent within the data map. The relevancy value is calculated using a voting methodology, where each of the patents in the data map vote for each other. The number of times that each second order patent is referenced by a first order patent in the data map is calculated, and the reference is given two votes (the first order patent gives two votes to each second order patent it is connected to). The number of times that each second order patent is referenced by a second order patent in the data map is calculated, and the reference is given 1 vote (the second order patents give one vote to each second order patent they are directly connected to). In this example, the direction of the citation is taken into account. 'By' refers to a forward citation from one data record to another recird. For example, in relation to FIG. 12, patent E would get one vote from D, but D would not get a vote from E. Another method may be used whereby the direction of citation does not influence the relevancy value of the patents in the network, however, this will give a different result for the relevancy and similarity of each patent in the network. Table 5 details an example calculation of the relevancy value for second order patent E in FIG. 12 is shown.

TABLE 5

Relevancy Value for Patent E

| Connection | Votes |
|---|---|
| C-E | 2 votes |
| D-E | 1 vote |
| B-E | 2 votes |

The relevancy value of patent E is therefore 5 (the summed votes from the connected first and second order patents). The overall similarity score of the second order patent, the 'ghost patent', may then be calculated by giving a weighting to the importance value and the relevancy value. In one form, the importance value is given a weighting of 0.25 and the relevancy value is given a weighting of 0.75. Usually the relevancy value is attributed greater significance than the importance value, as the relevancy value is more specific to the search enquiry. The score of ghost patent E in FIG. 12 would therefore be 4.82 (0.75×5+0.25×4.29).

As will be immediately apparent to the skilled addressee, there will usually be a much greater number of second order patents than first order patents. Presenting all of the second order patents may therefore clutter a presentation. One way to deal with this problem is to reduce the number of second order patents. The method of reducing includes the steps of determining the ideal number of ghost patents to be displayed (this is based on the number of first order patents in the network), which in turn determines the reduction severity; ranking the second ghost patents by distributing the similarity scores over percentile buckets (for example buckets of 0% increasing in 10% increments to 100% will give 10 buckets) and then determining the reduction point that gives less than the required number of second order patents. The percentile buckets ensure that two second order patents with the same score both survive the reduction. The reduced set of ghost patents may then be presented with the first order patents, as is shown in FIG. 5A.

A system, in the form of a computer, may be provided to rank, reduce and present data records. The system may comprise an identifying means, in the form of a user input into a computer program, for identifying the focus patent. The system may also comprise a calculating means, in the form of a processor, for calculating the similarity score of the secondary data records. The secondary data records may be ranked in dependence on the similarity score as described above. Further, a means, again in the form of processor, may be provided for reducing the secondary data records. Also, a display means, in the form of a computer screen, for presenting the reduced secondary data records with the primary and target data records may be provided. The presentation allows the user to identify primary and secondary data records that are directed toward a similar concept to the focus patent.

Returning to FIG. 12 and Tables 2 & 3, a computer implemented method of determining the similarity score of at least one pair of data records is shown. The method includes the step of identifying at least one pair of directly connected data records, in the form of patents that share a citation, in the data record set. The method then calculates a connection distance between the directly connected data records. The connection distance may be determined using the connection strength (also referred to as link value) as described in relation to Tables 2 & 3. The connection strength may be calculated by identifying further data records that are directly connected to both of the data records in the pair of directly connected data records to derive a count of the total number of connections between data records of the pair, and calculating the connection strength in dependence on the count.

One method of determining the connection distance between directly connected data records is to convert the connection strength into a value between zero and one, as detailed in Table 6 with reference to the connection strength (link values) determined in Tables 2 & 3. In this example, the conversion factor between link value and connection distance is 1/sqrt(connection strength). The conversion from connection strength to a connection distance can be a variety of forms. This could even be a sum of squares, or another form of conversion that has the same effect of using the connection strength to determine the similarity between two indirectly connected data records.

Using the conversion factor 1/sqrt(connection strength), a high link value becomes a small connection distance. A pair of indirectly connected data records may then be identified, where indirectly connected data records are connected via at least two pairs of directly connected data records. For example, data records I and D in FIG. 12 are indirectly connected in that they are connected via four directly connected pairs, D-E, B-E, A-B and I-A. Data records I and D are also connected via six directly connected pairs I-A, A-J, J-B, B-C, C-E and E-D. As can be seen in FIG. 12, there are a number of pathways between indirectly connected data records I and D.

TABLE 6

Connection distance between pairs of directly connected data records

| Connection | Connection Strength | Connection Distance |
|---|---|---|
| A-I | 1 | 1.00 |
| A-H | 1 | 1.00 |
| A-J | 2 | 0.71 |
| A-B | 3 | 0.58 |
| A-C | 2 | 0.71 |
| C-G | 1 | 1.00 |
| C-F | 1 | 1.00 |
| C-D | 2 | 0.71 |
| C-B | 3 | 0.58 |
| B-E | 2 | 0.71 |
| C-E | 3 | 0.58 |
| D-E | 2 | 0.71 |
| B-J | 2 | 0.71 |

The similarity score of the pair of directly and indirectly connected data records may then be calculated. This calculation is in dependence on the connection distance between the directly connected data records. For example, the connection distance between data records I and D could be the sum of the connection distances between each of the directly connected pairs, D-E, B-E, A-B and I-A, or, I-A, A-J, J-B, B-C, C-E and E-D. The shortest connection distance may be allocated to each indirectly connected pair of data records. One method to determine the shortest connection distance between two indirectly connected data records is to use the A* pathway algorithm, or any other suitable shortest pathway finding algorithm. For I and D, the shortest connection distance is via directly connected pairs I-A (1), A-C (0.71) and C-D (0.71), being 2.42. The similarity score for each pair of documents in the data map is calculated, the presentation of which allows a user to identify pairs of directly or indirectly connected data records that disclose similar concepts that may be in similar or dissimilar technical fields. For example, a patent in the technical field of telecommunicates may disclose or claim similar concepts to a patent in the technical field of computer science.

In the situation where there are a large number of data records, it may be beneficial to present only the most similar pairs of data records. The method may therefore also include the steps of setting a predetermined level for the similarity score between the pairs of indirectly connected data records, removing the pairs of indirectly connected data records that are below the predetermined level, and ranking the remaining pairs of indirectly connected data records in dependence on the similarity score. The ranked data records may be from the most similar to the least similar of the remaining pairs of data records. When the data records are in the form of patents, this ranking would provide the user with a list or graphic of the documents that detail the patents that are most likely to be directed towards a similar concept. Alternatively, the method may include the option of stopping once it identifies that the citation distance between any indirectly connected pair of data records is greater than a predetermined value. The ensuing report may consist of a listing of directly and indirectly connected pairs of data records, in the form of patent pairs, and their connection distance values, where the priority date may be used as a predictor to determine either patent anticipation or patent infringement.

For example, if Company A had a large patent portfolio and wanted to compare their portfolio with the large patent portfolio of Company B, this method would provide Company A with the ability to quickly assess their patents that are most similar to Company B's patents. This would be useful if Company A wanted to determine which of Company B's patents are most likely to anticipate or infringe their patents. Further, this method could also be used as an alternate to the method for determining the 'relevancy value', as described above, when identifying the most similar second order patents. In addition, this method could be used to determine data records that are a third or fourth order (or above) connections, which are very similar to a target data record.

Turning again to FIG. 6A, applicant has attended to rating all of the connected patents which resulted in changes to the colours of the dots of respective nodes 560, 566, 568, 570, 572, 574 to magenta, reflecting a rating of 2 for "relevant". The nodes 564, 576, 578, 580, 582 and 584 have orange coloured dots, reflecting a rating of 1 for "potentially relevant"; whilst nodes 586, 588, 590 and 592 are represented as green coloured dots, reflecting a rating of 0 (zero) for "not relevant". It is notable that the applicant found a majority of the phantom nodes to be relevant to its investigation of linked patent records.

In FIG. 6B, a node 564 of a potentially relevant connected patent U.S. Pat. No. 6,349,001 ('001) is enlarged and shown with the node visited to reveal the patent summary box 540a populated from the relevant patent record. In the embodiment, a mouse click actuation can lock the summary box "open", and allow visits to other node for comparative purposes. The '001 patent is here considered to be "influential" in the patent data set, since it has a score 548a of 13. In other words the '001 patent is 13 times as influential, i.e. interconnected to other patents, as the average issued US patent. This example demonstrates the potential of the system and method of the embodiment to intuitively search a collection of records, such as patents in a database, to find potentially relevant records. The patent summary box 540a includes two further user actuable buttons, situated below the rating button 550a, namely a "Details" button 554 and a "Focus" button 556. Upon actuation of the Details button 554, the system of the embodiment is arranged to open a fresh window which displays full details of the patent record as retrieved from an associated patent database, for example as supplied through the Google Patents web portal, providing full details relating to the patent record.

The Focus button 556 provides another feature that can also assist in finding relevant prior art, namely the ability to 'walk the network', or refocus the patent network on another patent. In the present example, this has been done by actuating the Focus button in the patent summary box 540a for the '001, as patent discussed above. The result of the refocus, which effectively designates U.S. Pat. No. 6,349,001 as the identifier of the patent record of primary interest and re-generates another (new) visual representation 600 after determining which records in the patent data set are connected to the '001 patent and then "scoring" each connected patent, is shown in FIG. 7. It is important to note that the focus action reveals a different set of data from the patent database, due to the particular links with the '001 patent. It can be seen that the patent summary box is locked in place and the node 564 highlighted by a contrasting coloured circle. It should be noted that some of the nodes in the new representation 600 relate to patents that have already been reviewed and ranked by the user. Thus, for example, the node 588 is already a contrasting coloured in green, node 576 is coloured in orange and nodes 560, 566, 568, 572 and 574 are coloured magenta. This is because these nodes are for patents that were also seen in the network representation which focused on the '946 patent, and the system of the embodiment remembered the previous user ratings for these patents and transferred the ratings across to the new representation 600. Practically, this means that a user does not have to review these patents again, and instead can give attention to the 'new' patents from the re-generated set, which are indicated by the nodes contrastingly coloured in grey. Furthermore, the contents of the audit trail history, including comments entered in box 552 that have earlier been listed in the user results zone 528 (see FIG. 4) are also retained in the present embodiment.

It is apparent from FIG. 7 that the visual representation 600 illustrates a patent document network graph having many more nodes and links than the previous representation 532 of FIG. 5A. As introduced in relation to FIG. 4, the menu bar 506 provides several tools that may assist in reducing complexity of the representation. These tools include the patent year range slider 508—which allows earlier issued patents to be temporarily removed from the representation, the % slider 510—which allows lower scoring patents to be temporarily removed, and the keyword field 512—which allows entry of a keyword such as a descriptor or an applicant name to highlight relevant nodes (such as by a contrasting coloured concentric circle around relevant nodes). The removals of patent nodes described above further reduce clutter as the associated links to the filtered patent nodes are also removed.

Figure 8A:
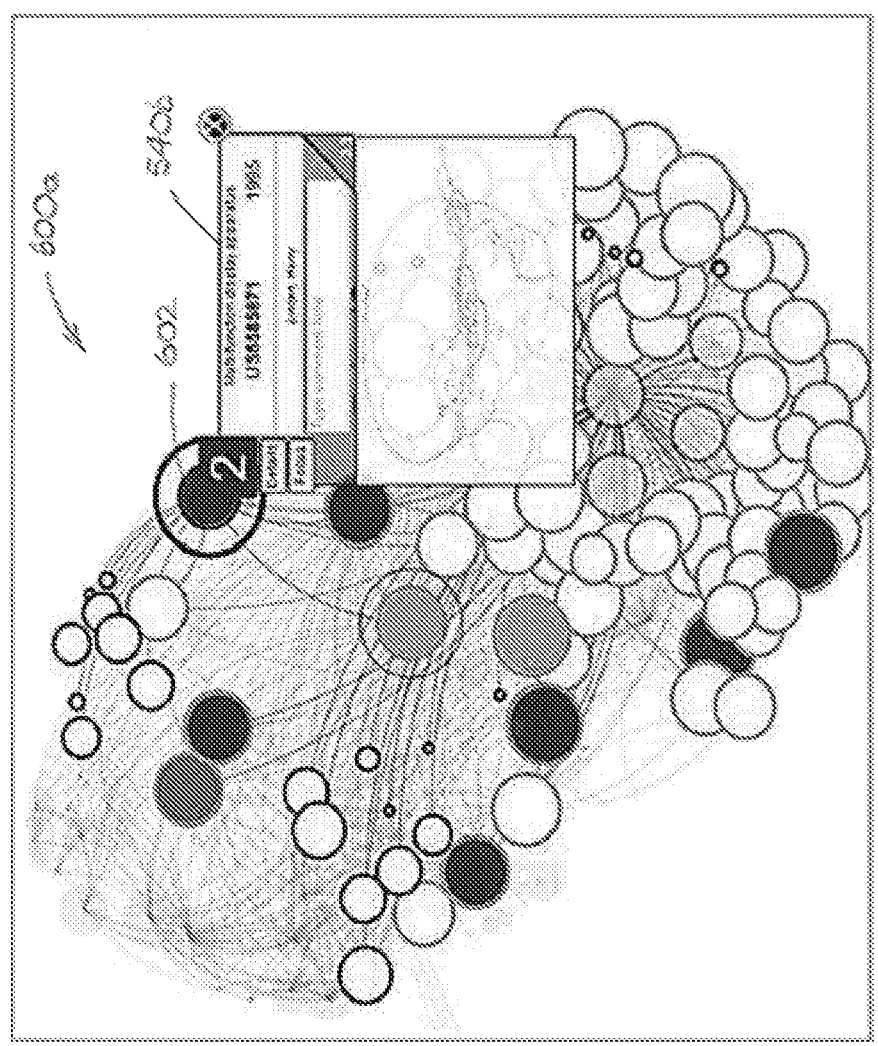
FIG. 8A depicts a visual representation of the network of FIG. 7 wherein a different node has been selected.

But are any of these patents in the re-generated representation 600 relevant to the '946 patent? Yes, some of them might be so further investigation by the user is merited. One way of "walking the network", for example, is by the user actuating the "Next" button 501 in the bottom left corner of the framework. This employs the patent score value to select the next most relevant node 602, which relates to the patent record for U.S. Pat. No. 5,585,871—in relatively close proximity as depicted in FIG. 8A. From the patent summary pop-up box 540b, we observe this patent has a score of 3.3. The applicant has rated this patent disclosure as a "2" for relevant to the investigation. Hence we have a second avenue for finding patents relevant to a starting patent of interest.

Figure 8B:
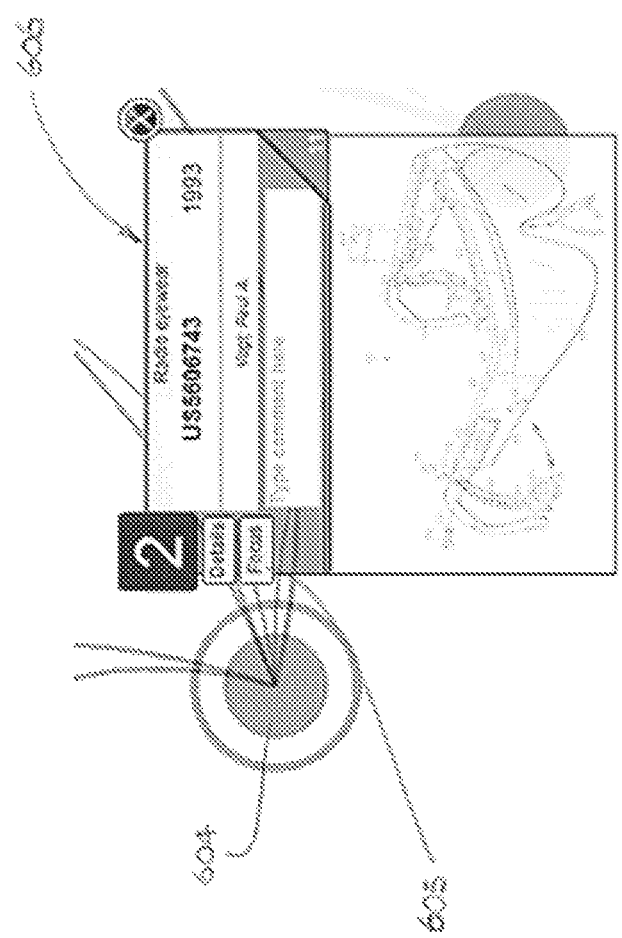
FIG. 8B depicts an enlarged portion of the visual representation of FIG. 8A wherein data of a selected phantom node has been rated.
Figure 9:
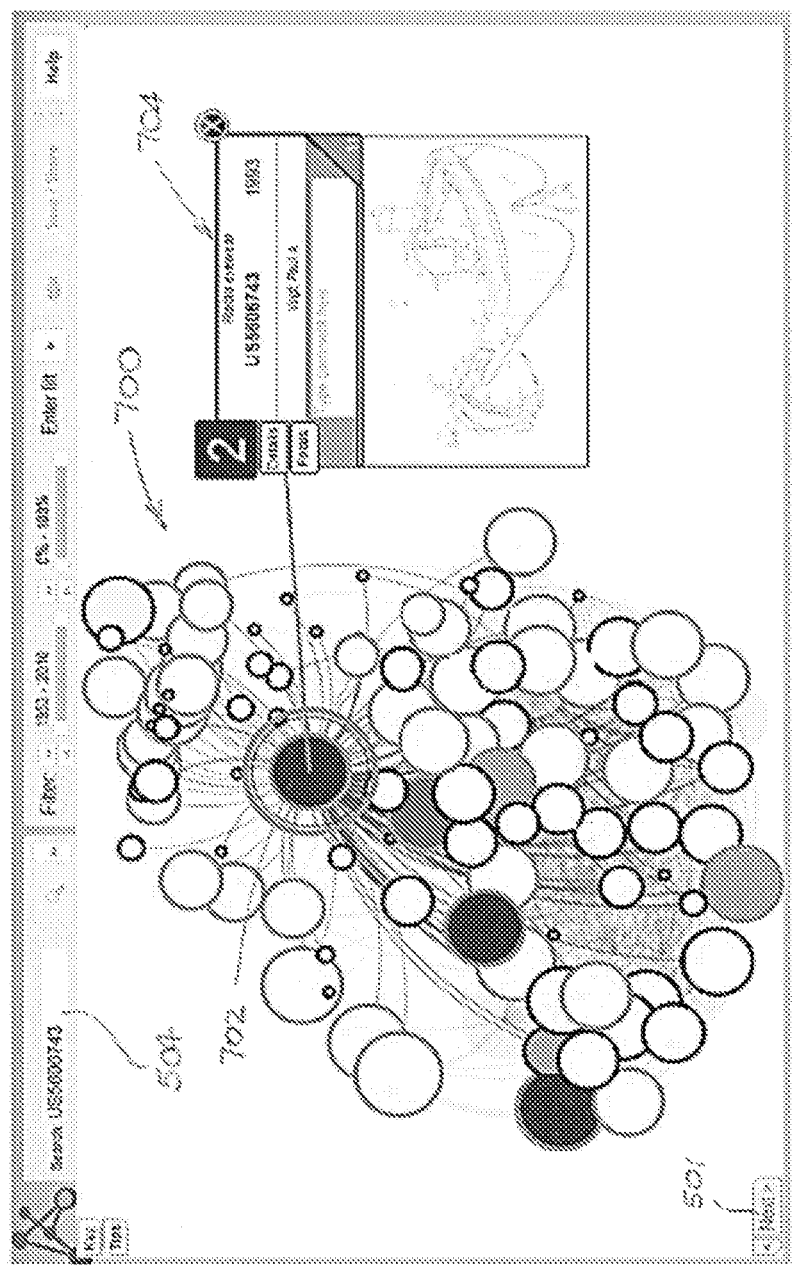
FIG. 9 depicts a visual representation of a further network of related data records, employing another different focus record.

However, there are also quite a few phantom nodes for other patents, for example patent record U.S. Pat. No. 5,606,743 at node 604 in FIG. 8B. The display is updated by hitting the Focus button 605. Upon actuation the search (see field 504) has been re-focussed, as shown in FIG. 9. This is an influential patent at node 702, with a score of 11 as evident from the respective patent summary 704, in other words 11 times as influential as the average granted US patent. This is a third way of identifying relevant patents during searching.

Figure 10:
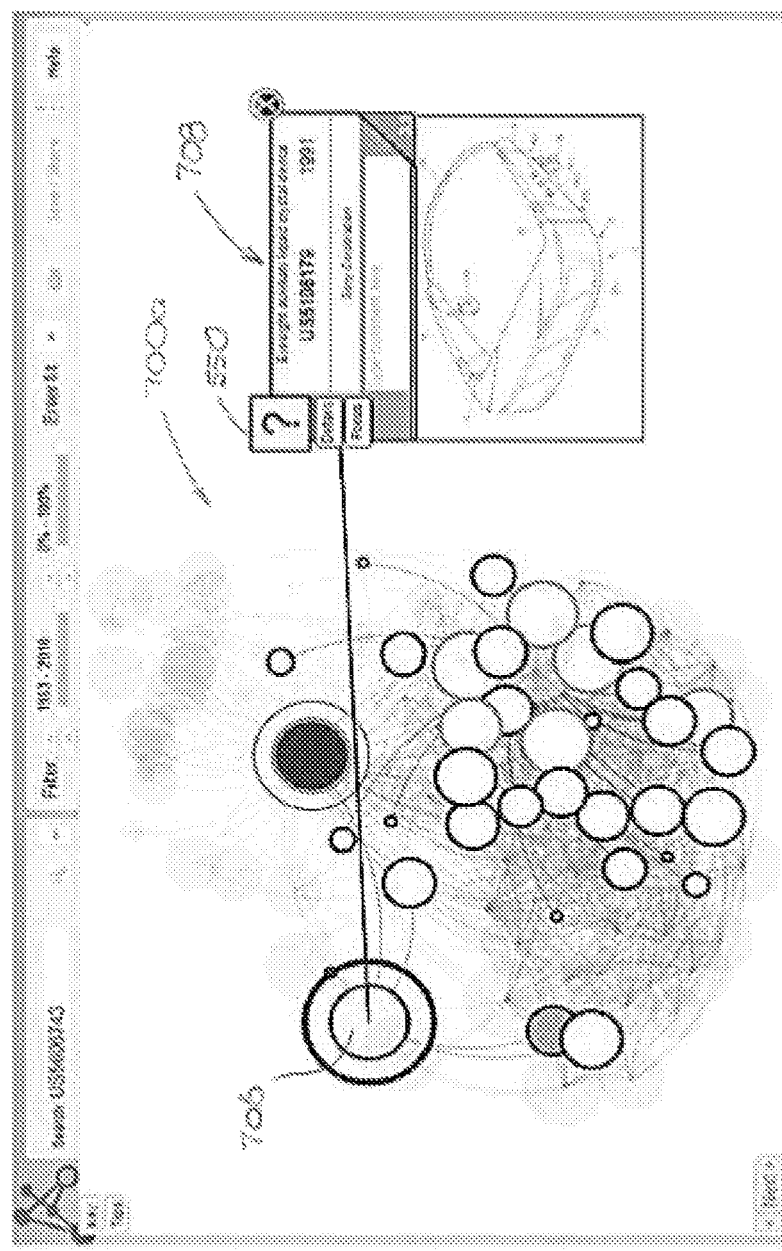
FIG. 10 depicts a visual representation of the further network of FIG. 9 wherein another different node has been selected.

Upon actuating the Next button 501, we are taken to node 706 which relates to patent record U.S. Pat. No. 5,100,6179 which (from the "?" icon in the rating button) has not been previously reviewed/rated, as depicted in FIG. 10.

In the discussion of the above example, we have shown how it is possible to find potentially relevant patent prior art, some of it missed by the patent examination processes, simply by starting with the patent number you are concerned with. This potentially relevant prior art could include:
  directly connected patents,
  ghost patents,
  patents connected to directly connected patents (friends of friends'), or
  patents connected to phantom patents (friends of friends of friends').

A simple search using a conventional patent search for a patent which is close, but not close enough, can provide a suitable starting patent.

It is also worth considering what has not been done in this search example, viz:
  We have not looked at any keywords or semantic terms, although this option is available if required. Different patent applicants can use different keywords for the same inventive concepts, and this can cause errors when searching for patent subject matter using keywords alone.
  We have not looked at any patent classifications, such as the International Patent Classification (IPC) codes, which can be imprecise.
  It has not been necessary have not spent hours and hours looking long lists of patents, many of them irrelevant. Instead we have relied on the power of citation networks to quickly identify relevant, some of which appear to be missed by the original patent examiner.

The network graph representation of the embodiment can provide a visual guiding mechanism based on node size, number and thickness of links, position of nodes in the representation with respect to the node for the initially searched "focus" patent (distance), and the position of nodes for patents with respect to other patents (clustering), including patents represented by phantom nodes. As will be apparent from the following discussion, users can intuitively select patents to look at based on one or more of the following considerations:
  "influential" patents, where node size reflects a patent record score;
  the number of patent links, either forward or backward connects;
  the thickness of the links between the focus patent and other patents of interest, which line may reflect the shared friend count for that link;

the distance from the patent to the focus patent or other patents of possible interest; and/or whether some patents sit in a cluster of similar and relevant patents.

In another embodiment, the system and method may be arranged to provide a local importance score by comparing a global importance score (global score) to the same score for immediately connected (e.g. via citation linkage) patents (or and $2^{nd}$ order, etc), rather than on keyword or IPC scores. Such a local importance score could be in comparison to the average of the same score of the connected patent, or a relative ranking in relation to these other scores, or any other suitable criteria.

In further embodiments of the invention, it is envisaged that the system will be able to capture a representation of the patent graph, rankings, etc. in the form of file accessed via a unique hyperlink, which can be emailed to a user's email address or any other desired/authorised party, and being able to reopen the visual presentation of the captured patent graph at the same point by selecting this hyperlink. The hyperlinked file is to includes all the users additional comments and annotations for the patent graph, and can be used to reopen the graph, and user rankings/comments etc from any suitably enabled browser.

In still further embodiments of the invention there may be provided certain patent database specific tools, including:

1) Family Member Searching

Imagine that you select an Australian patent number, and only find a few citation linkages. But there is a part of the patent summary box which allows the user to say open up a second box, which shows all known family members, including for example a US patent family member. By selecting this US family member (or any other family member), a new network is formed, based on this selected family member, but all search history and rankings is retained as with other patent refocussing.

Furthermore, the order of the family members in this second box could be ranked by their global score ratings.

2) Highlighting of Novelty/Obviousness Linkages

Some patent examiners prepare long lists of prior art patents, but only discuss a small number in their examination reports or office actions. In the US these references appear in a "Notice of References Cited" list, for example, since references are cited in support of novelty and/or obviousness rejections. In the later case, the order of the references may be important, as the first mentioned patent may be the strongest evidence against the patent application.

Where a list of such prior art patents, i.e. citation connections. Such connections could be a sub-set of the broader list of connections. A further level of detail could include highlighting such connections in the representations of patent data networks, with different highlighting for novelty objections, first obviousness objection, other obviousness objections. All of other connections could optionally be made to disappear, taking connected patents with them, so a tighter map is shown.

The system could re-calculate a patent influence score based entirely on, or weighted towards, these novelty/inventive step connections. The system could also recalculate line thickness of links to be weighted towards these novelty/inventive step connections. As an alternative, we could provide a similar scheme based on X and Y weighting in say WO and/or EPO search reports.

3) Correction/Substitution of Patent Application Numbers

When you plug in a patent application or publication number in to the search field, and there is a granted patent with for the application with a different number, the number is translated and then shown on the screen as the equivalent granted number for that jurisdiction, not the application/publication number.

Alternative embodiments of a system and methods for analysing and visualising a for analysis are also described in co-pending U.S. Utility application Ser. No. 13/179,437 by the applicant entitled "A system, method and computer program for analysing and visualising data", which is incorporated herein by reference. These embodiments are advantageous in that alternative schemes for analysis of data are provided that may be conveniently visualized using apparent variations of the present disclosure.

Although not required, the embodiments described with reference to the drawing figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. For example the system and method for visually navigating data sets including one or more networks of related data records of the invention may be adapted for utilisation with other connected data records, such as cross-referenced document collections, website pages, publications, trade mark records, court judgements, online objects, people networks, etc. The present embodiments are, therefore, to be considered in all respects as illustrative and not restrictive.

Any reference to prior art contained herein is not to be taken as an admission that the information is common general knowledge, unless otherwise indicated.

Although not required, embodiments described with reference to the drawings can be implemented to operate with any form of communication network operating with any type of communication protocol. Generally, where the underlying communication network or communication protocol includes additional routines, functionalities, infrastructure or packet formats, the skilled person will understand that the implementation of embodiments described including with reference to the drawings may be modified or optimized for operation with these additional routines, functionalities, infrastructure or packet formats.

What is claimed is:

1. A computer implemented method of determining a similarity score of at least one pair of indirectly connected data records within a data set, wherein indirectly connected data records are connected via at least two pairs of directly connected data records, the method comprising:

for each pair of directly connected data records in the data set:
- calculating a connection strength between the pair of directly connected data records wherein the connection strength is calculated by:
  - determining a number of shared connections between the pair of directly connected data records by determining, for each data record of the pair, further directly connected data records and identifying common data records from the further directly connected data records as the shared connections, and
  - counting the direct connection and the number of shared connections to provide the connection strength; and
- calculating a connection distance between the directly connected data records, wherein the calculation of the connection distance is a function of the connection strength, operating to convert the connection strength into a value between zero and one; and for each pair of the at least one pair of indirectly connected data records:
- determining one or more sets of directly connected pairs, each set comprising a connection pathway between the pair of indirectly connected data records via the at least two pairs of directly connected data records; and
- calculating the similarity score of the pair of indirectly connected data records based on the connection distance between the directly connected data records of each set, wherein the similarity score facilitates identification of pairs of data records that disclose similar concepts.

2. A computer implemented method in accordance with claim 1, wherein the method further includes the step of:
- calculating the similarity score of at least one pair of directly connected data records based on the connection distance between the directly connected data records.

3. A computer implemented method in accordance with claim 1, wherein calculating the similarity score of a pair of indirectly connected data records comprises summing the connection distance between the directly connected data records of each set.

4. A computer implemented method in accordance with claim 1, further comprising:
- determining a shortest connection distance for a pair of indirectly connected data records.

5. A computer implemented method in accordance with claim 4, wherein the shortest connection distance is determined using an A* pathway algorithm.

6. A computer implemented method in accordance with claim 4 wherein the similarity score of the pair of indirectly connected data records is based on the shortest connection distance.

7. A computer implemented method in accordance with claim 1, further comprising:
- setting a predetermined threshold level for the similarity score between the at least one pair of indirectly connected data records;
- removing any pair of the at least one pair of indirectly connected data records that have a similarity score below the predetermined threshold level; and
- ranking any remaining pairs of the at least one pair of indirectly connected data records based on the similarity score of each pair.

8. A computer implemented method in accordance with claim 1, wherein the data records are patents, the patents being directly connected in that they share a citation.

9. A system for ranking, reducing and presenting at least one pair of data records, the system comprising:
- a processor configured to calculate the similarity score of at least one pair of data records according to claim 1 and to rank the at least one pair of data records based on the similarity score;
- a processor configured to reduce the at least one pair of data records, the reducing being dependent on the ranking of the at least one pair of data records; and
- a display for presenting the reduced at least one pair of data records, the presentation allowing a user to identify pairs of data records that disclose similar concepts.

10. A system according to claim 9 further comprising an attribute filter, the attribute filter operable to remove data records from the presentation.

11. A system according to claim 10 wherein reduction of the data records caused by operation of the attribute filter does not require of regeneration of the presentation.

12. A system according to claim 10 wherein reduction of the data records caused by operation of the attribute filter temporarily removes the data records from the presentation.

13. A system according to claims 10 wherein the attribute filter also removes links associated with the removed data record to further reduce clutter from the presentation.

14. A system according to claims 10 wherein the attribute filter is a percentage slider operable by a user to remove the data records.

15. A computer implemented method in accordance with claim 1, further comprising:
- initially receiving an identifier of a data record of interest from within a data set having at least some related data records;
- determining records in the data set that are associated with the identified data record of interest;
- determining connection strength and distance between pairs of directly connected records and similarity scores between pairs of indirectly connected records;
- generating a visual representation of the identified data record and associated data records in a graph structure wherein the data records are nodes that are interconnected by links each representing the association between respective data records, thereby forming a network and visually representing connection strength between directly connected data records;
- displaying, upon selection of a node representing a data record, predetermined attribute information from an underlying data record for consideration;
- allowing, during display of the predetermined attribute information, designation of a further data record of interest; and
- repeating the steps of the method utilizing an identifier of the designated data record.

16. A computer implemented method as claimed in claim 15, further comprising:
- effecting, during display of the predetermined attribute information, copying of said predetermined attribute information into a separate zone of the visual representation.

17. A system according to claim 9, further configured for presentation and visual navigation of a data set including related data records, the system comprising:
- a processor arranged for access to a data set including a plurality of related records;

the processor associated with an interface and further arranged to perform a method comprising:
- receiving, via the interface, an identifier of a data record of interest from within a data set;
- determining records in the data set that are associated with the identified data record of interest;
- determining connection strength and distance between pairs of directly connected records and similarity scores between pairs of indirectly connected records in accordance with claim 1;
- generating, via the interface, a visual representation of the identified data record and associated data records in a graph structure wherein the data records are nodes that are interconnected by links each representing the association between respective data records, thereby forming a network and visually representing connection strength between directly connected data records;
- displaying, upon selection of a node representing a data record via the interface, predetermined attribute information from an underlying data record for consideration;
- allowing, during display of the predetermined attribute information, designation of a further data record of interest; and
- repeating the method utilizing an identifier of the designated data record.

18. A system as claimed in claim 17, wherein the processor is further arranged to: effect, during display of the predetermined attribute information, copying of said attribute information into a separate zone of the visual representation.

* * * * *